(12) United States Patent
Northrup et al.

(10) Patent No.: US 10,977,486 B2
(45) Date of Patent: *Apr. 13, 2021

(54) BLOCKWISE EXTRACTION OF DOCUMENT METADATA

(71) Applicant: International Business Machines Corporation, Armonk, NY (US)

(72) Inventors: Kevin Northrup, North York (CA); Craig M. Trim, Sylmar, CA (US); Terry Hickey, Toronto (CA); Thozamile Javu, Halifax (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,802

(22) Filed: Sep. 30, 2019

(65) Prior Publication Data
US 2020/0026913 A1 Jan. 23, 2020

Related U.S. Application Data

(63) Continuation of application No. 15/828,813, filed on Dec. 1, 2017, now Pat. No. 10,452,904.

(51) Int. Cl.
*G06K 9/00* (2006.01)
*G06F 40/30* (2020.01)
(Continued)

(52) U.S. Cl.
CPC ......... *G06K 9/00463* (2013.01); *G06F 16/35* (2019.01); *G06F 16/367* (2019.01);
(Continued)

(58) Field of Classification Search
CPC combination set(s) only.
See application file for complete search history.

(56) References Cited

U.S. PATENT DOCUMENTS

| 7,035,463 B1 | 4/2006 | Yusuke |
| 9,251,413 B2 | 2/2016 | Meier et al. |

(Continued)

FOREIGN PATENT DOCUMENTS

| CN | 101329731 A | 12/2008 |
| CN | 103678260 A | 3/2014 |

(Continued)

OTHER PUBLICATIONS

C. Pasupathi, et al. "Web Document Segmentation Using Frequent Term Sets for Summarization," Journal of Computer Science, pp. 2053-2061, Jun. 4, 2012.

(Continued)

*Primary Examiner* — Tsung Yin Tsai
(74) *Attorney, Agent, or Firm* — Jim R. Nock, Esq.; George S. Blasiak, Esq.; Heslin Rothenberg Farley & Mesiti PC

(57) ABSTRACT

Methods, computer program products, and systems are presented. The methods include, for instance: obtaining a document image, wherein the document image includes a plurality of objects; identifying a plurality of macroblocks within the document image; performing microblock processing within macroblocks of the plurality of macroblocks, wherein the microblock processing includes examining content of microblocks within a macroblock for extraction of key-value pairs, the examining content including performing an ontological analysis of microblocks, wherein the microblock processing includes associating confidence levels to the extracted key-value pairs; and outputting metadata based on the performing microblock processing within macroblocks of the plurality of macroblocks.

25 Claims, 12 Drawing Sheets

(51) Int. Cl.
*G06F 40/109* (2020.01)
*G06F 40/117* (2020.01)
*G06F 40/163* (2020.01)
*G06F 16/93* (2019.01)
*G06F 16/36* (2019.01)
*G06F 16/35* (2019.01)
*G06F 40/154* (2020.01)

(52) U.S. Cl.
CPC ............ *G06F 16/93* (2019.01); *G06F 40/109* (2020.01); *G06F 40/117* (2020.01); *G06F 40/163* (2020.01); *G06F 40/30* (2020.01); *G06F 40/154* (2020.01)

(56) References Cited

U.S. PATENT DOCUMENTS

| | | | |
|---|---|---|---|
| 9,471,550 | B2 | 10/2016 | Boutelle et al. |
| 2001/0032218 | A1 | 10/2001 | Huang |
| 2007/0168382 | A1 | 7/2007 | Tillberg et al. |
| 2009/0070415 | A1* | 3/2009 | Kishi ............... G06F 16/00 709/203 |
| 2010/0074524 | A1* | 3/2010 | Stollman ............ G06F 40/30 382/175 |
| 2011/0033095 | A1* | 2/2011 | Hale ............... G06F 40/30 382/131 |
| 2012/0102388 | A1 | 4/2012 | Fan |
| 2012/0203752 | A1* | 8/2012 | Ha-Thuc ........... G06F 16/35 707/706 |
| 2013/0332145 | A1* | 12/2013 | Bostick ............ G06F 16/36 704/9 |
| 2014/0108897 | A1* | 4/2014 | Boutelle ........... G06F 40/154 715/201 |
| 2015/0256712 | A1 | 9/2015 | Wshah et al. |
| 2015/0324459 | A1* | 11/2015 | Chhichhia ......... G06F 16/93 706/12 |
| 2015/0379557 | A1 | 12/2015 | Liu et al. |
| 2016/0371238 | A1 | 12/2016 | Heavenrich et al. |
| 2017/0098192 | A1 | 4/2017 | Follis |
| 2017/0300565 | A1 | 10/2017 | Calapodescu et al. |
| 2019/0171873 | A1* | 6/2019 | Northrup ............ G06K 9/00456 |
| 2019/0171875 | A1* | 6/2019 | Northrup ............ G06K 9/00456 |

FOREIGN PATENT DOCUMENTS

| | | |
|---|---|---|
| WO | WO 2007070010 A1 | 6/2007 |
| WO | WO2019/106507 A1 | 6/2019 |

OTHER PUBLICATIONS

C. Ramakrishnan, et al. "TaxaMiner: Improving Taxonomy Label Quality Using Latent Semantic Indexing" ESWC Conferences, (2006).

O. Medelyan, et al. "Constructing a Focused Taxonomy from a Document Collection," ESWC Semantic Web Conferences—Part of the Lecture Notes in Computer Science Book Series (LNCS) vol. 7882, pp. 367-381, (2013).

Y. Song, et al. "A Novel Image Text Extraction Method Based on K-means Clustering," Seventh IEEE/ACIS Conference on Computer and Information Science, pp. 185-190 (2008).

International Application Status Report for International Application No. PCT/IB2018/059250, filed Nov. 23, 2018, dated Jul. 11, 2019.

Notification of Transmittal of the International Search Report and the Written Opinion of the International Searching Authority for International Patent Application No. PCT/IB2018/059250, filed Nov. 23, 2018, dated Mar. 22, 2019.

International Search Report for International Patent Application No. PCT/IB2018/059250, filed Nov. 23, 2018, dated Mar. 22, 2019.

Written Opinion of the International Searching Authority for International Patent Application No. PCT/IB2018/059250, filed Nov. 23, 2018, dated Mar. 22, 2019.

Notice of Allowance, U.S. Appl. No. 15/828,813, dated Jun. 5, 2019.

List of IBM Patents or Patent Applications Treated as Related, Oct. 2, 2019, 2 pages.

Cluster Analysis in Wikipedia, The Free Encyclopedia, Bearbeitungsstand: Nov. 30, 2017. URL: https://en.wikipedia.org/w/indexphp'?title=Clusteranalysis&oldid=812816727 [abgerufen am Sep. 2, 2021].

Office Action in conesponding DE Application No. 112018005616.3, filed Nov. 23, 2018, dated Feb. 10, 2021 (Cited with a copy of the original document and a full text translation).

* cited by examiner

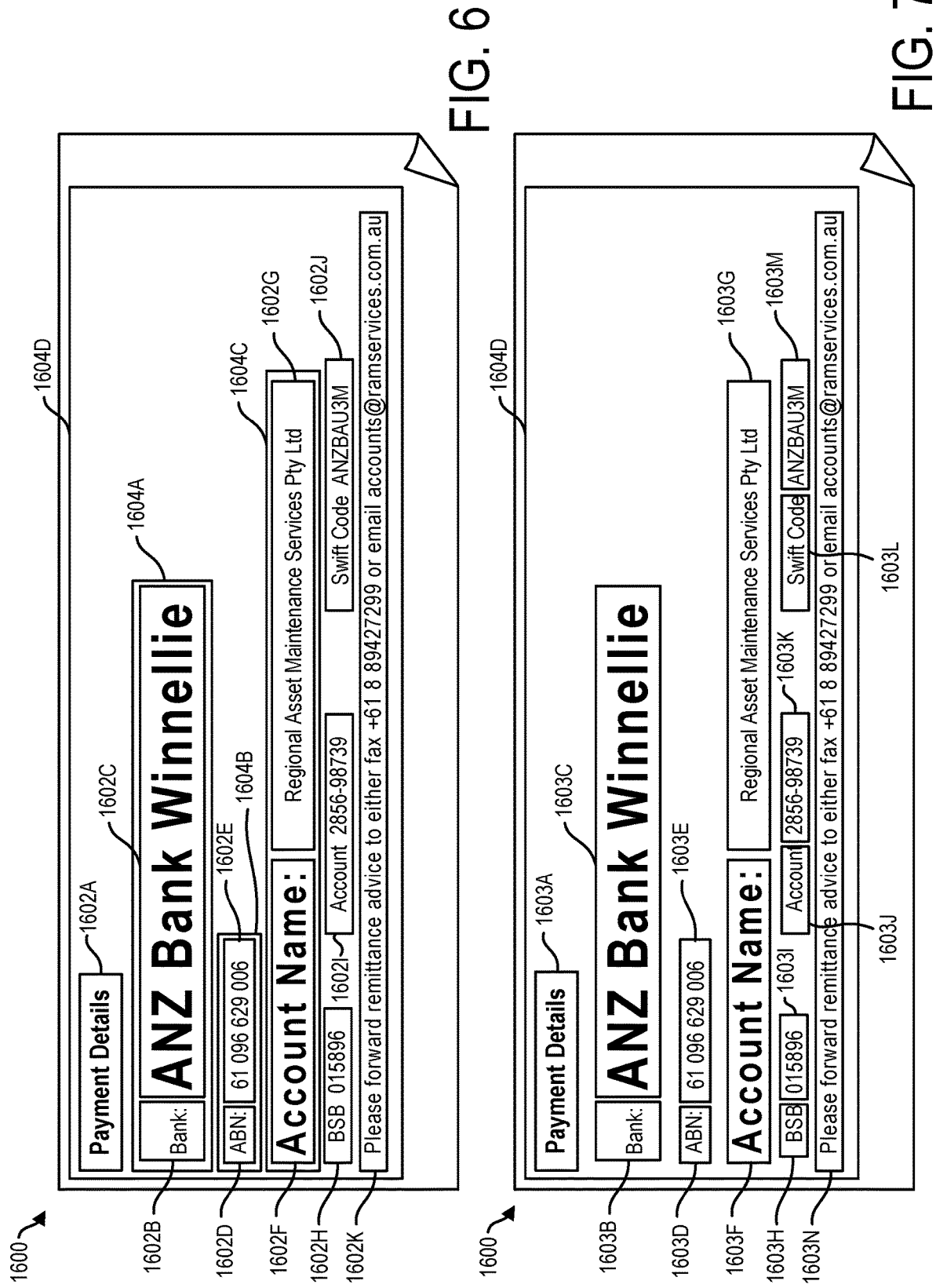

140

Y/N KVP 82% — Bank: ANZ Bank Winnellie
Y/N KVP 90% — ABN: 61 096 629 006
Y/N KVP 85% — Account Name: Regional Asset Maintenance Services Pty Ltd
Y/N KVP 95% — BSB: 015896
Y/N KVP 92% — Account Number: 2856-98739
Y/N KVP 74% — Swift Code: ANZBAU3M

Payment Details:

Comments: Please forward remittance advice to either fax +61 8 89427299 or e-mail accounts@ramservices.com.au

```
L401:   "BlockList":[
        {
L402:   "BlockStartX":4755,
L403:   "BlockStartY":387,
L404:   "Remark":"",
L405:   "BlockWidth":1750,
L406:   "LineList":[
        {
L407:   "WordList":[
        {
L408:   "WordValue":"XYZ Inc.",
L409:   "WordHeight":204,
L410:   "WordDensity":"0.249529190207",
L411:   "WordStartX":5031,
L412:   "WordStartY":437,
L413:   "FontSize":"fontSizeGroup_1",
L414:   "WordID":"word_0",
L415:   "WordCharN":8,
L416:   "WordWidth":472
        },
        ...
        ],
L417:   "LineWidth":1364,
L418:   "LineStartX":5031,
L419:   "LineStartY":433,
L420:   "LineHeight":103,
L421:   "LineID":"line_0"
        },...
        ...
L511:   {
L512:   "FromBlockID": "block_16",
L513:   "Value": "573093486",
L514:   "ValueStartX": 628,
L515:   "ValueStartY": 6916,
L516:   "KeyStartX": 300,
L517:   "KeyStartY": 6917,
L518:   "Key": "Acct No",
L519:   "Key Class Confidence": 82.35,
L520:   "Key Class": "customerAccountNumber"
L521:   }
```

FIG. 10

BLOCKWISE EXTRACTION OF DOCUMENT METADATA

CROSS-REFERENCE TO RELATED APPLICATION

This application is a continuation of U.S. application Ser. No. 15/828,813, filed Dec. 1, 2017, entitled "Blockwise Extraction of Document Metadata", which is incorporated by reference herein in its entirety.

TECHNICAL FIELD

The present disclosure relates to document processing technology, and more particularly to methods, computer program products, and systems for cognitively digitizing data from document images.

BACKGROUND

In conventional document processing, ink-on-paper documents are scanned page by page as respective visual images in preparation. A resulting document file of scanned papers is typically a series of visual image of pages. Each visual image of a page does not have accessible content, and existing document processing applications may digitize certain visual image patterns into digitized data, which may be accessible and operational by use of corresponding computer program application. Such data digitizing process of visual images are often referred to as extraction, or data extraction. In light of the amount of information represented in legacy paper forms and scanned documents images, extraction of such document images may greatly affect general productivity in many areas of industry as well as society.

SUMMARY

The shortcomings of the prior art are overcome, and additional advantages are provided, through the provision, in one aspect, of a method. The method includes, for example: obtaining a document image, wherein the document image includes a plurality of objects; identifying a plurality of macroblocks within the document image; performing microblock processing within macroblocks of the plurality of macroblocks, wherein the microblock processing includes examining content of microblocks within a macroblock for extraction of key-value pairs, the examining content including performing an ontological analysis of microblocks, wherein the microblock processing includes associating confidence levels to the extracted key-value pairs; and outputting metadata based on the performing microblock processing within macroblocks of the plurality of macroblocks.

The shortcomings of the prior art are overcome, and additional advantages are provided, through the provision, in one aspect, of a computer program product including a computer readable storage medium readable by one or more processor circuit and storing instructions for execution by one or more processor for performing a method including, for example: obtaining a document image, wherein the document image includes a plurality of objects; identifying a plurality of macroblocks within the document image; performing microblock processing within macroblocks of the plurality of macroblocks, wherein the microblock processing includes examining content of microblocks within a macroblock for extraction of key-value pairs, the examining content including performing an ontological analysis of microblocks, wherein the microblock processing includes associating confidence levels to the extracted key-value pairs; and outputting metadata based on the performing microblock processing within macroblocks of the plurality of macroblocks.

The shortcomings of the prior art are overcome, and additional advantages are provided, through the provision, in one aspect, of a system including: a memory; one or more processor in communication with memory; and program instructions executable by the one or more processor via the memory to perform a method including, for example: obtaining a document image, wherein the document image includes a plurality of objects; identifying a plurality of macroblocks within the document image; performing microblock processing within macroblocks of the plurality of macroblocks, wherein the microblock processing includes examining content of microblocks within a macroblock for extraction of key-value pairs, the examining content including performing an ontological analysis of microblocks, wherein the microblock processing includes associating confidence levels to the extracted key-value pairs; and outputting metadata based on the performing microblock processing within macroblocks of the plurality of macroblocks.

The shortcomings of the prior art are overcome, and additional advantages are provided, through the provision, in one aspect, of a method. The method includes, for example: obtaining a document image, wherein the document image includes a plurality of objects; identifying a macroblock within the document image, wherein the macroblock includes objects of the plurality of objects; examining content of microblocks within an area of the macroblock of the document image for extraction of one or more key-value pair, wherein the examining includes examining content of unaligned microblocks within the area of the microblock, and wherein the examining content of unaligned microblocks within the area of the microblock includes applying an ontological analysis; associating a confidence level to a key-value pair of the one or more key-value pair; and outputting the one or more key-value pair The shortcomings of the prior art are overcome, and additional advantages are provided, through the provision, in one aspect, of a computer program product including a computer readable storage medium readable by one or more processor circuit and storing instructions for execution by one or more processor for performing a method including, for example: obtaining a document image, wherein the document image includes a plurality of objects; identifying a macroblock within the document image, wherein the macroblock includes objects of the plurality of objects; examining content of microblocks within an area of the macroblock of the document image for extraction of one or more key-value pair, wherein the examining includes examining content of unaligned microblocks within the area of the microblock, and wherein the examining content of unaligned microblocks within the area of the microblock includes applying an ontological analysis; associating a confidence level to a key-value pair of the one or more key-value pair; and outputting the one or more key-value pair.

The shortcomings of the prior art are overcome, and additional advantages are provided, through the provision, in one aspect, of a system including: a memory; one or more processor in communication with memory; and program instructions executable by the one or more processor via the memory to perform a method including, for example:

obtaining a document image, wherein the document image includes a plurality of objects; identifying a macroblock within the document image, wherein the macroblock includes objects of the plurality of objects; examining content of microblocks within an area of the macroblock of the document image for extraction of one or more key-value pair, wherein the examining includes examining content of unaligned microblocks within the area of the microblock, and wherein the examining content of unaligned microblocks within the area of the microblock includes applying an ontological analysis; associating a confidence level to a key-value pair of the one or more key-value pair; and outputting the one or more key-value pair The shortcomings of the prior art are overcome, and additional advantages are provided, through the provision, in one aspect, of a method. The method includes, for example: obtaining a document image, wherein the document image includes a plurality of objects; processing the document image to identify a baseline styling parameter value, the baseline styling parameter value specifying a baseline font height; identifying for each word of a line of text of the document image a relative styling parameter, the relative styling parameter being defined in reference to the baseline styling parameter value, wherein the relative styling parameter specifies a font height of a word of text of the text line as a percentage value of the baseline styling parameter value; and providing the relative styling parameter as output metadata for output.

The shortcomings of the prior art are overcome, and additional advantages are provided, through the provision, in one aspect, of a computer program product including a computer readable storage medium readable by one or more processor circuit and storing instructions for execution by one or more processor for performing a method for extracting data from a document image including, for example: obtaining a document image, wherein the document image includes a plurality of objects; processing the document image to identify a baseline styling parameter value, the baseline styling parameter value specifying a baseline font height; identifying for each word of a line of text of the document image a relative styling parameter, the relative styling parameter being defined in reference to the baseline styling parameter value, wherein the relative styling parameter specifies a font height of a word of text of the text line as a percentage of a value of the baseline styling parameter value; and providing the relative styling parameter as output metadata for output.

The shortcomings of the prior art are overcome, and additional advantages are provided, through the provision, in one aspect, of a system including: a memory; one or more processor in communication with memory; and program instructions executable by the one or more processor via the memory to perform a method including for example: obtaining a document image, wherein the document image includes a plurality of objects; processing the document image to identify a baseline styling parameter value, the baseline styling parameter value specifying a baseline font height; identifying for each word of a line of text of the document image a relative styling parameter, the relative styling parameter being defined in reference to the baseline styling parameter value, wherein the relative styling parameter specifies a font height of a word of text of the text line as a percentage of the baseline styling parameter value; and providing the relative styling parameter as output metadata for output.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts an exemplary document image, to which adjustable block identification parameters are applied in order to identify macroblocks, in accordance with one or more embodiments set forth herein;

FIG. 7 depicts an exemplary document image, to which adjustable block identification parameters are applied in order to identify macroblocks, in accordance with one or more embodiments set forth herein;

FIG. 9 depicts output metadata output by a document digitization engine in accordance with one or more embodiments set forth herein;

FIG. 10 depicts output metadata output by a document digitization engine in accordance with one or more embodiments set forth herein;

DETAILED DESCRIPTION

Figure 1:
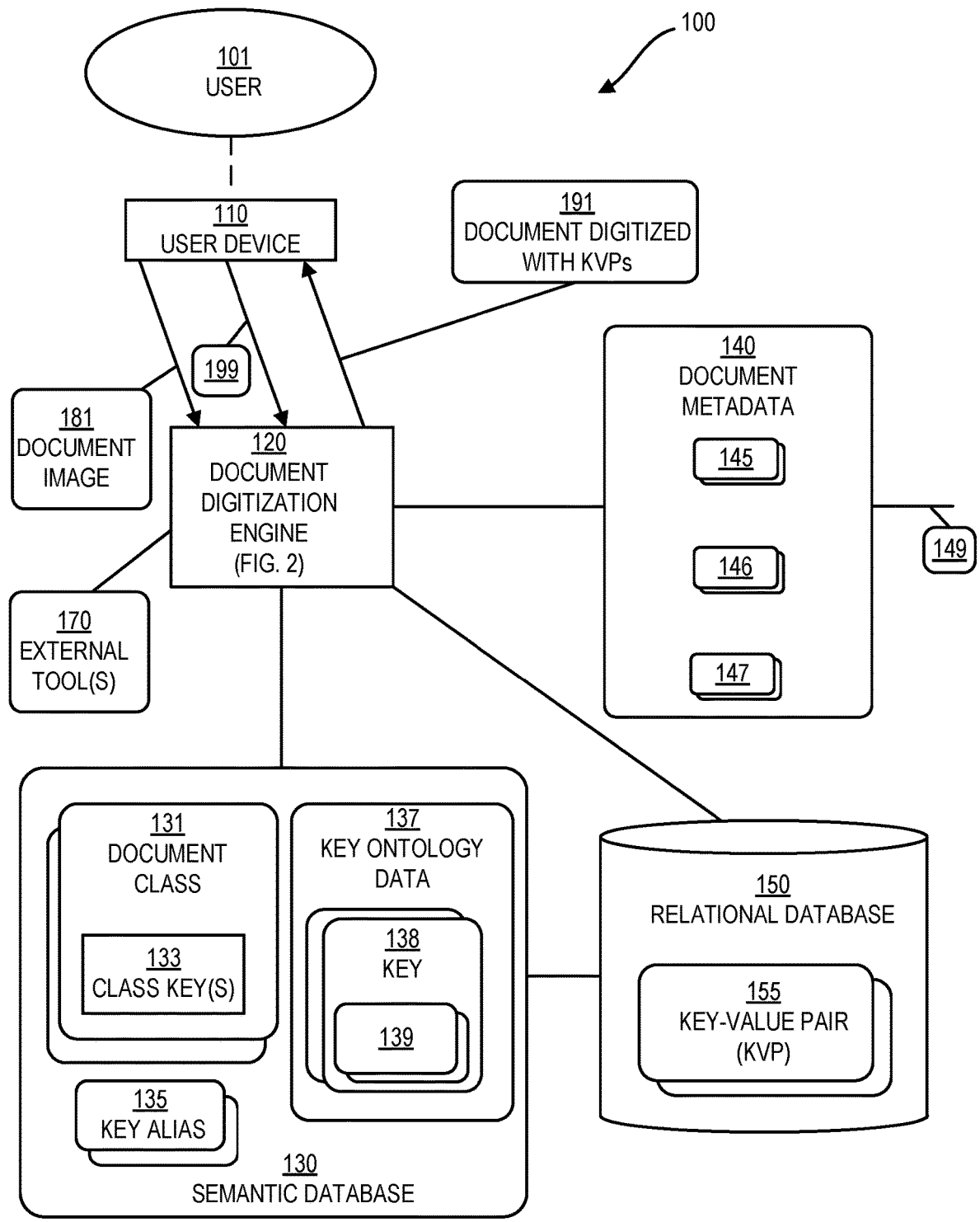
FIG. 1 depicts a system for cognitively digitizing document images, in accordance with one or more embodiments set forth herein.

FIG. 1 depicts a system 100 for cognitively digitizing document images, in accordance with one or more embodiments set forth herein.

Extracting computational data from document image is often unsuccessful due to wide variety of custom formats, individual styles, diverse alignments, and non-text contents. Consequently, enormous amount of information represented in documents images are not as accessible as fully digitized documents. Document images without digitization have limited usages such as visual viewing and archival purposes. In the alternative, the time and cost required for manual digitization of such document images would be prohibitive, considering the number of documents that would be benefited from digitization.

Digital documents are often preferred for the convenience in computationally using data represented in the documents. When pen-on-paper documents are scanned in, the documents are a series of visual image of pages, but not computationally ready for usage as digital data. Accordingly, many document digitization applications have been developed in order to accurately extract computational data from document images. In existing document processing applications, numerous custom formats and organizations of documents present challenges in processing visual images of a document and extracting computational data out of the document. Embodiments herein implement a cognitive digitization process of document images as human readers understand meanings conveyed by visual marks in documents, and improves efficiency and accuracy of data extraction from document images. Embodiments herein extract metadata from documents by methods that are not reliant solely on alignment of objects or on semantical relationships between objects but rather which employ a combination of alignment based processing and semantics based processing.

The system 100 includes a document digitization engine 120. The document digitization engine 120 receives a document image 181 from a user 101 via a user device 110. The document image 181 is a visual image of a document created for a certain information, which is not computational data. For example, a scanned image of a paper document does not have any digitized data so text in the scanned image may not be searched or be read into another application as data input. The document image 181 has numerous objects, which may be extracted as computational data. In this specification, the term "object" refers to an identifiable individual entity in the document image, and the term "microblock" refers to a smallest unit of candidate data identified from a corresponding object in the document, for various analyses in order to find relationships among the objects, according to a microblock machine logic delineation rule. The document digitization engine 120 represents each microblock with numerous microblock characteristics, including content, position, style of each microblock.

The document digitization engine 120 automatically extracts data from the document image 181 based on multilayered collinearity analysis such that the information extracted from images of texts and numbers in the document image 181 may be computational data that is usable by other programs and applications. A relational database 150 coupled to the document digitization engine 120 stores a key-value pair (KVP) 155 of a plurality of KVPs corresponding to the data extracted from the document image 181. The document digitization engine 120 associates the key-value pairs with respective confidence levels. The term "key-value pair" refers to a primary data representation unit with a key and a value, in which the key describes or identifies the value. The KVPs may be hierarchically organized into a larger data structure, as often seen in relational database tables.

The document digitization engine 120 may determine metadata 140 for objects in the document image 181. Metadata 140 which defines digitized computational data may include, for example, characteristics metadata 145 such as content, position, and style, key-value-pairs metadata 146 which may include associated confidence levels, and relative styling metadata 148 which specifies styling at an area of a document in relation to a larger area. The output metadata may be organized to specify a taxonomy indicating hierarchical relationships between objects of a document image 181. The document digitization engine 120 may output metadata in a suitable markup e.g. JSON or XML, and in one embodiment may output metadata in a machine readable stylesheet representative of content of the document. Document digitization engine 120 may output metadata to one or more process interface 149. The document digitization engine 120 may use one or more external tool 170 such as Optical Character Recognition (OCR) for determining metadata.

In this specification, the term "collinearity" refers to a geometrical alignment among recognizable objects in the document image 181 as the document digitization engine 120 deems meaningful in order to identify a macroblock based on two or more microblocks as being collinear; term "microblock" refers to individual objects recognized from the document image 181; and term "macroblock" refers to a group of two or more microblocks to form a meaningful data unit such as a Key-Value Pair (KVP) and a column, or a row, in a table. A macroblock may define a spatial area that encompasses a spatial area of two or more microblocks.

With conventional document image processing, discovering collinearity correctly in documents of countless custom formats for extracting usable data is an ongoing process. The document digitization engine 120 utilizes a multilayered approach with collinearity and semantics, in order to achieve a more comprehensive recognition of the document image 181 than conventional document image processing applications, and in order to extract usable data from the document image 181 as a result.

The document digitization engine 120 analyzes collinearity amongst the microblocks based on a plurality of adjustable collinearity parameters, in order to extract computational data from a plurality of microblocks determined to be aligned in the document image 181. Examples of cohesive data may include individual key-value pairs and sets of KVPs as in a table in a document. Examples of the adjustable collinearity parameters may include, but are not limited to, font height and style changes, alignments, and punctuations. A key-value pair is a macroblock that includes two microblocks, as the key is a microblock and the value is another microblock, where the two microblocks align with one another based on the collinearity analysis by the document digitization engine 120.

The document digitization engine 120 further utilizes various semantic information stored in a semantic database 130 in order to extract data from the document image 181. A few examples of the information in the semantic database 130 may include, but are not limited to, one or more document class 131, one or more key alias 135, and key ontology data 137. Detailed operations of the document digitization engine 120 is described in FIGS. 2, 3, and 4.

In the semantic database 130, each of the one or more document class 131 corresponds to one or more class keys 133, that any document in each document class is to include. For example, when a document is of a purchase invoice class, a corresponding class key may include, but are not limited to, a name, a transaction date, an item list, an amount, etc.

In the semantic database 130, the one or more key alias 135 includes aliases for numerous keys, which may appear in the document image 181 in place of a key. The one or more key alias 135 is often looked up for the one or more class keys 133, because all the class keys corresponding to a class are to appear in one document. For example, the class key may specify an "Account Number" class key, but the document image 181 may have a key with "Acct. #" text, but not a text of "Account Number". The one or more key alias 135 lists interchangeable names, such as "Account Number" and "Acct. #" in order to accommodate analysis and data extraction of wide variety of customized documents.

Key ontology data 137 of the semantic database 130 defines a set of constraints and meanings modeling a domain of knowledge represented by the document image 181. The key ontology data 137 includes a plurality of keys that may present in the document image 181. A key 138 among the plurality of keys is associated with various characteristics including properties of the key 138, one or more sets to which the key 138 belongs, and relationships among members of a same set of the one or more sets. Also, the document digitization engine 120 may conclude that two semantically associated text blocks are collinear. For example, the key 138 may have a data type 139 property specifying a proper data type of a value for the key 138, such as a text string for a CustomerLastName key, an eight-digit number for a DateOfBirth key. In the same example, if a text string has a common name value such as "Johnson", the document digitization engine 120 may determine the CustomerLastName key and the text string "Johnson" as a KVP, even though the text string is misaligned with the key within a proximity range. In the same example, the document digitization engine 120 runs a classifier (one of the external tools 170) with the text string "Johnson" in order to determine that the text string "Johnson" is a data type for names. For another example, the key 138 may be one of the one or more class keys 133, and have relationships with other class keys defined in the key ontology data 137, such as an Invoice document class includes both a CustomerNumber class key and an Amount class key.

Figure 2:
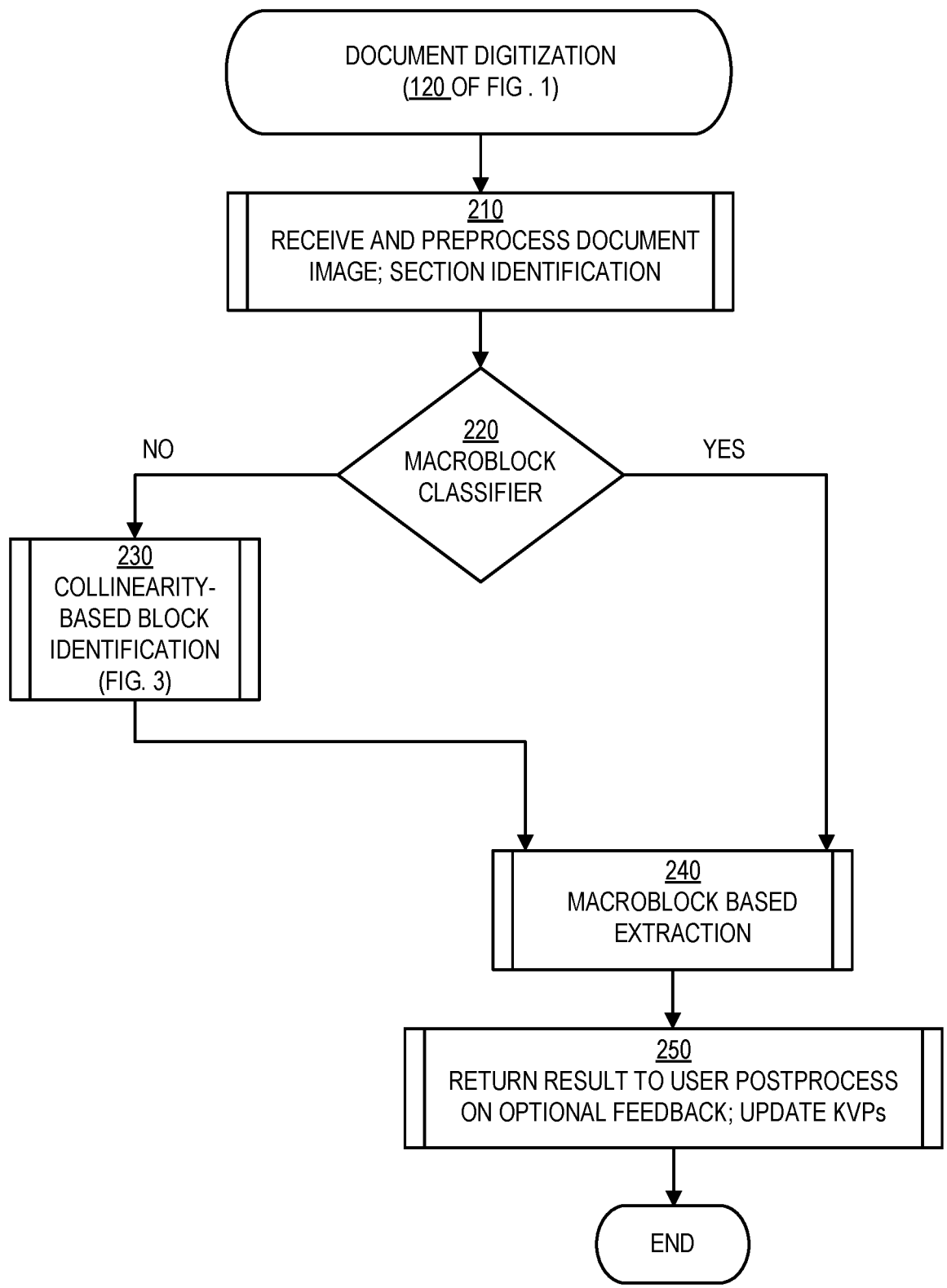
FIG. 2 depicts a flowchart of operations performed by the cognitive document digitization engine, in accordance with one or more embodiments set forth herein.

FIG. 2 depicts a flowchart of operations performed by the document digitization engine 120 of FIG. 1, in accordance with one or more embodiments set forth herein.

In block 210, the document digitization engine 120 receives a document image and processes the document image. The received document image may have more than one distinctive visual pattern in one page. The document digitization engine 120 identifies such patterns as respective sections in the document. In this specification, the term "object" refers to an image object in the document image, and the term "microblock" refers to an indivisible unit block identified from a corresponding image object, according to a microblock machine logic delineation rule, for collinearity analysis. Then the document digitization engine 120 proceeds with block 220.

In block 220, the document digitization engine 120 applies a macroblock classifier to respective sections of the document image 181 using a macroblock classifier such as a table classifier, a word density classifier (an area where text density is above a threshold may be identified as a macroblock), an address classifier, a paragraph classifier. If the document digitization engine 120 does not discover a macroblock of objects in the document, then the document digitization engine 120 proceeds with block 230. If the document digitization engine 120 discovers one or more macroblock of objects in the document, then the document digitization engine 120 proceeds with block 240.

In block 230, the document digitization engine 120 analyzes microblocks in the document image 181 and identifies macroblocks based on extended collinearity analysis of the microblocks. Detailed operations of block 230 are described in FIG. 3 and corresponding description. Then the document digitization engine 120 proceeds with block 250.

In block 240, the document digitization engine 120 respectively analyzes macroblocks that are identified as a result of macroblock classification in block 220 or collinearity analysis in block 230. Detailed operations of block 240 are described in FIG. 5 and corresponding description. Then the document digitization engine 120 proceeds with block 250.

In block 250, the document digitization engine 120 returns a result of digitized document image having computational data to a user. The document digitization engine 120 optionally receives a feedback 199 on the result from the user. The document digitization engine 120 updates key-value pairs generated from block 230 and/or tables generated from block 240 according to the feedback, then terminate processing the document image 181 received in block 210. In block 250 document digitization engine 120 may output metadata e.g. to a process interface 149.

The document digitization engine 120 may perform block 230 as well as block 240, depending on the sections in the document image 181, in order to support various formats of custom documents having a mixture of object clusters and tables of various organizations. The document digitization engine 120 may iterate block 230 and/or block 240 as necessary according to the objects present in the document image 181.

Figure 3:
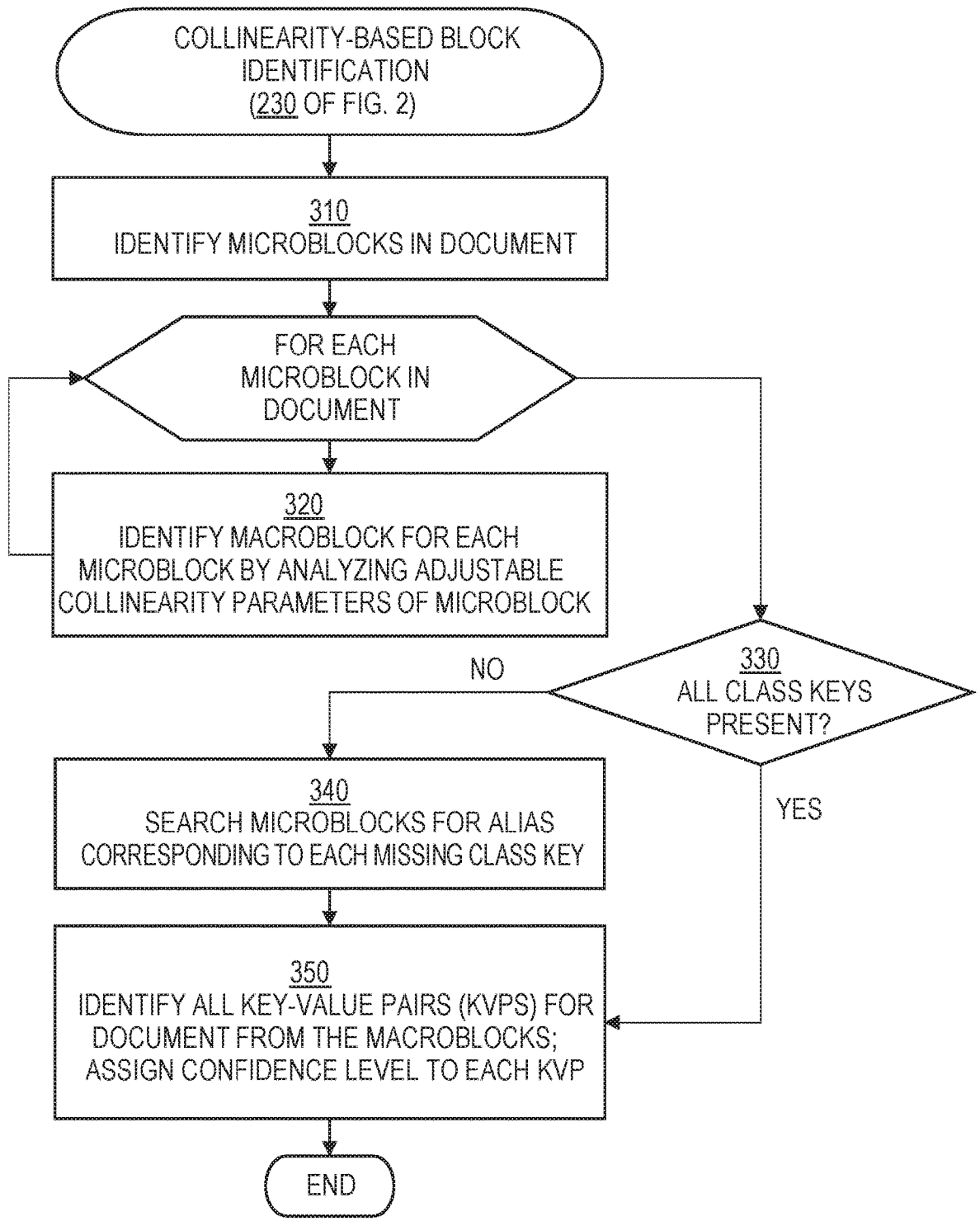
FIG. 3 depicts detailed operations of multi-layered block identification, as performed by the cognitive document digitization engine, in accordance with one or more embodiments set forth herein.

FIG. 3 depicts detailed operations of block 230 of FIG. 2, multi-layered block identification, as performed by the document digitization engine 120 of FIG. 1, in accordance with one or more embodiments set forth herein.

In block 310, the document digitization engine 120 identifies microblocks in the received document, from corresponding objects. The objects may be either a text string, a numerical number, a symbol, or a pictorial image. The document digitization engine 120 measures horizontal and vertical spaces between objects, in absolute distances and/or in relative proximities, in preparation of collinearity analysis. Then the document digitization engine 120 proceeds with block 320.

In block 320, the document digitization engine 120 identifies a macroblock corresponding to each microblock identified in block 310 by analyzing the respective positions of two or more microblocks in proximity based on adjustable collinearity parameters of the microblock. The document digitization engine 120 may identify a macroblock based on two or more microblocks that are collinear according to the adjustable collinearity parameters. The document digitization engine 120 proceeds with block 330 upon identifying respective macroblocks for all microblocks in the received document.

In one embodiment, the document digitization engine 120 may determine that two or more microblocks are collinear based on the adjustable collinearity parameters without exact alignment when the two or more microblocks are within a certain distance range, in absolute distances or in relative positions. The adjustable collinearity parameters include: font; paragraph alignment; punctuation mark; and ontological matching. The adjustable collinearity parameter indicates that the document digitization engine 120 may associate two microblocks in a collinear relationship even though the two microblocks have distinctive fonts and different sizes/styles, have different paragraph alignments in respective microblocks, and/or are separated by a punctuation marks. Further, the document digitization engine 120 may determine the two microblocks as a macroblock based on key ontology data, in which a certain key name and a data type for the key name is specified, for example. Examples and detailed description of the adjustable collinearity parameters are presented in FIG. 4 and corresponding description.

In block 330, the document digitization engine 120 determines a class of the received document and whether or not all class keys required in the class of the document have been identified. If the document digitization engine 120 determines that any class key has not been identified, then the document digitization engine 120 proceeds with block 340. If the document digitization engine 120 determines that all class keys have been identified, then the document digitization engine 120 proceeds with block 350.

In block 340, the document digitization engine 120 examines all microblocks identified in block 310 for respective aliases corresponding to each missing class key. For each alias found in place of a missing class key, the document digitization engine 120 identifies a macroblock including the microblock having the alias, as in block 320. Then the document digitization engine 120 proceeds with block 350.

In block 350, the document digitization engine 120 identifies all Key-Value Pairs (KVPs) from the macroblocks identified in block 320 and block 340. A microblock of each macroblock may correspond to a key in a KVP, and another microblock of the same macroblock may correspond to a value in the same KVP. The document digitization engine 120 assigns a confidence level to each identified KVP. The document digitization engine 120 heuristically determines the confidence level of a KVP based on various factors such as the level of proximity, ontological matching of respective key names and data types. For keys and values frequently appearing in formal and transactional documents, the confidence levels of KVPs may be higher than custom keys and values in informal and personal documents. Then the document digitization engine 120 proceeds with block 250 of FIG. 2.

Figure 4:
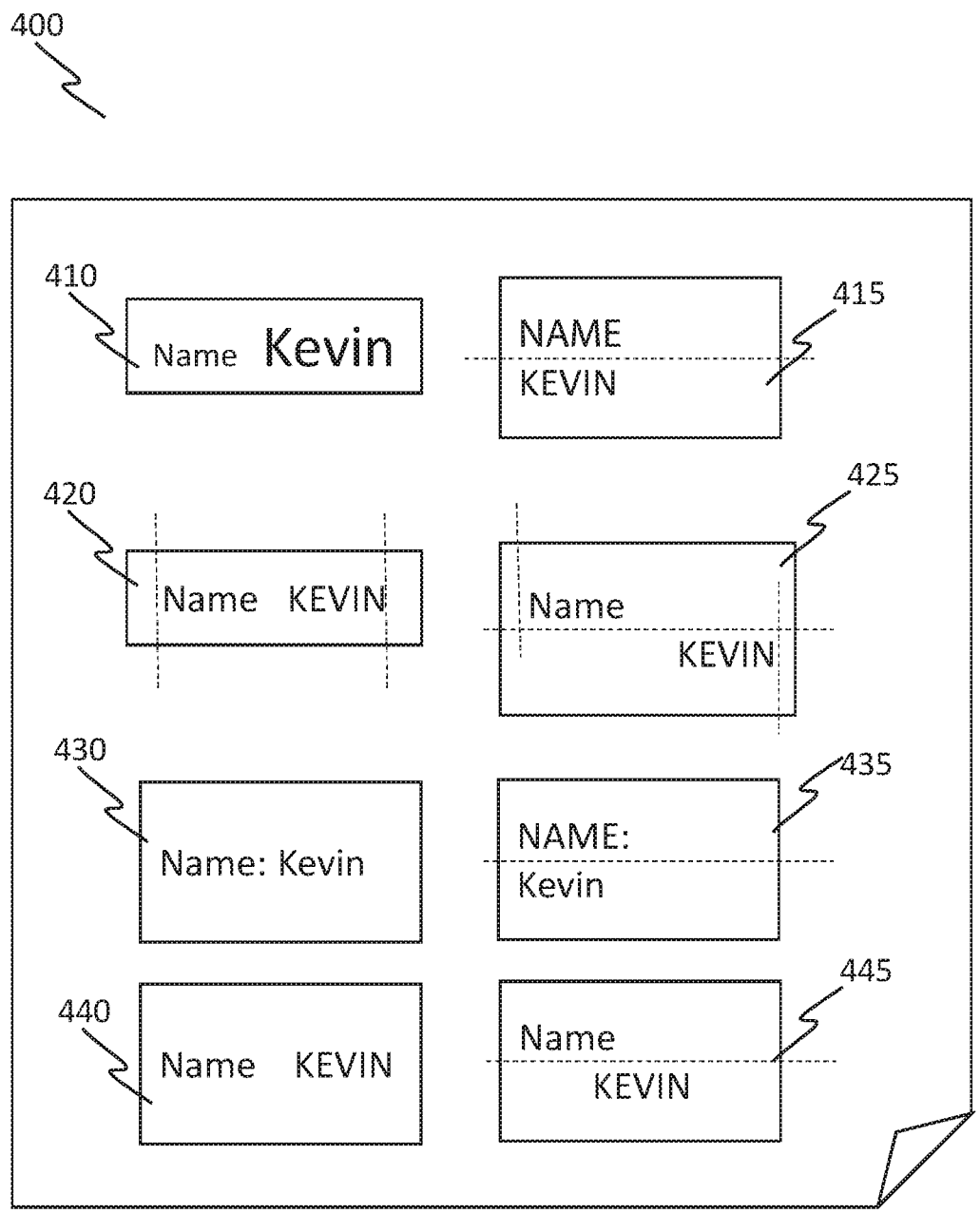
FIG. 4 depicts exemplary document images, to which adjustable block identification parameters are applied in order to identify macroblocks, in accordance with one or more embodiments set forth herein.

FIG. 4 depicts exemplary document images, to which adjustable block identification parameters are applied in order to identify macroblocks, in accordance with one or more embodiments set forth herein.

A document 400 includes two microblocks in various configurations. A first microblock has a text string "Name", and a second microblock has a text string "Kevin". "Name" text in the first microblock may be extracted as a key and "Kevin" text in the second microblock may be extracted as a value of the Name key, from which the document digitization engine 120 identifies a macroblock, or a Key-Value pair (KVP), Name="Kevin".

Configuration 410 depicts different font sizes in two adjacent microblocks, where "Name" microblock has a font smaller than the font of "Kevin" microblock. With existing document processing applications, font differences including size changes would prevent the two microblocks from being identified as a macroblock (KVP), which would otherwise form a KVP. The document digitization engine 120 is enabled to identify two microblocks having different font sizes as one macroblock (KVP), by using an adjustable collinearity parameter on font sizes.

Configuration 415 depicts different text styles in two vertically adjacent microblocks, where "Name" microblock is boldfaced but "Kevin" microblock has a normal face in the next line. With existing document processing applications, text style differences including typeface changes, for example, when a normal text is boldfaced, italicized, and underlined, would prevent the two microblocks from being identified as a macroblock (KVP), which would otherwise form a KVP. The document digitization engine 120 is enabled to identify two microblocks having different text styles as one macroblock (KVP), by using an adjustable collinearity parameter on text styles.

Configuration 420 depicts different paragraph alignments in two adjacent microblocks, where "Name" microblock is left aligned but "Kevin" microblock is aligned on the right end. With existing document processing applications, paragraph alignment differences as shown above would prevent the two microblocks from being identified as a macroblock (KVP), which would otherwise form a KVP. The document digitization engine 120 is enabled to identify two microblocks having different paragraph alignments as one macroblock (KVP), by using an adjustable collinearity parameter on paragraph alignments.

Configuration 425 depicts different paragraph alignments in two vertically adjacent microblocks, where "Name" microblock is left aligned but "Kevin" microblock is aligned on the right end in the next line. With existing document processing applications, paragraph alignment differences as shown above would prevent the two microblocks in respective lines from being identified as a macroblock (KVP), which would otherwise form a KVP. The document digitization engine 120 is enabled to identify two microblocks in respective lines having different paragraph alignments as one macroblock (KVP), by using an adjustable collinearity parameter on paragraph alignments.

Configuration 430 depicts two adjacent microblocks being separated by a punctuation mark, where ":", a colon is placed between "Name" microblock and "Kevin" microblock. With existing document processing applications, a separating punctuation mark as shown above may prevent the two microblocks from being identified as a macroblock (KVP), which would otherwise form a KVP. The document digitization engine 120 is enabled to identify two microblocks separated by a punctuation mark as one macroblock (KVP), by using an adjustable collinearity parameter on punctuation mark separation.

Configuration 435 depicts two vertically adjacent microblocks being separated by a punctuation mark, where ":", a colon is placed between "Name" microblock and "Kevin" microblock in the next line. With existing document processing applications, a separating punctuation mark as shown above may prevent the two microblocks in respective lines from being identified as a macroblock (KVP), which would otherwise form a KVP. The document digitization engine 120 is enabled to identify two microblocks in respective lines separated by a punctuation mark as one macroblock (KVP), by using an adjustable collinearity parameter on punctuation mark separation.

Configuration 440 depicts two adjacent microblocks being separated by a wide space, where the wide space between "Name" microlock and "Kevin" microblock ordinarily prevents the two microblocks from being identified as a macroblock (KVP) with existing document processing applications. The document digitization engine 120 is enabled to identify two microblocks separated by such wide space as one macroblock (KVP), by semantically analyzing texts of the two microblocks and by matching keys and values based on key ontology data, as "Kevin" is of a proper data type for a value for "Name" key.

Configuration 445 depicts two vertically adjacent microblocks being separated by a wide space, where the wide space between "Name" microblock and "Kevin" microblock in the next line ordinarily prevents the two microblocks from being identified as a macroblock (KVP) in existing document processing applications. The document digitization engine 120 is enabled to identify two microblocks in respective lines separated by such wide space as one macroblock (KVP), by semantically analyzing texts of the two microblocks and by matching keys and values based on key ontology data, as "Kevin" is of a proper data type for a value for "Name" key.

In certain embodiments, the document digitization engine 120 may have a predefined set of spacing categories, which may include, for example, tight spacing, single spacing (normal spacing), one-and-a-half spacing, double-spacing, and wide spacing, where each spacing category indicate a distinctive likelihood of collinearity between two macroblocks separated by the respective spacing categories. The set of spacing categories may be distinctive for microblocks within each macroblock.

The document digitization engine 120 may further apply semantic interpolation based on the presence of semantic indications such as conjunctions, disjunctions, and related symbols marks indicating semantic relations. For example, both "and" and "or" express continuation in a line, as in symbols "&", "+". Symbols such as "−" and "*" are often used as a line heading marker in a list. The document digitization engine 120 may take semantic interpolation into account for macroblock identification made from the spacing categories.

Even further, the document digitization engine 120 may also take relative styling into account for macroblock identification. The semantic interpolation and the relative styling generally have respective weights less than spacing according to absolute and relative measurements. The document digitization engine 120 may assign respective weights for certain elements based on a class of the document. For example, changes in style and fonts between two blocks within a certain distance range may weigh more for form documents such as transaction documents, invoices, and government forms than informal documents such as presentation slides.

Figure 5:
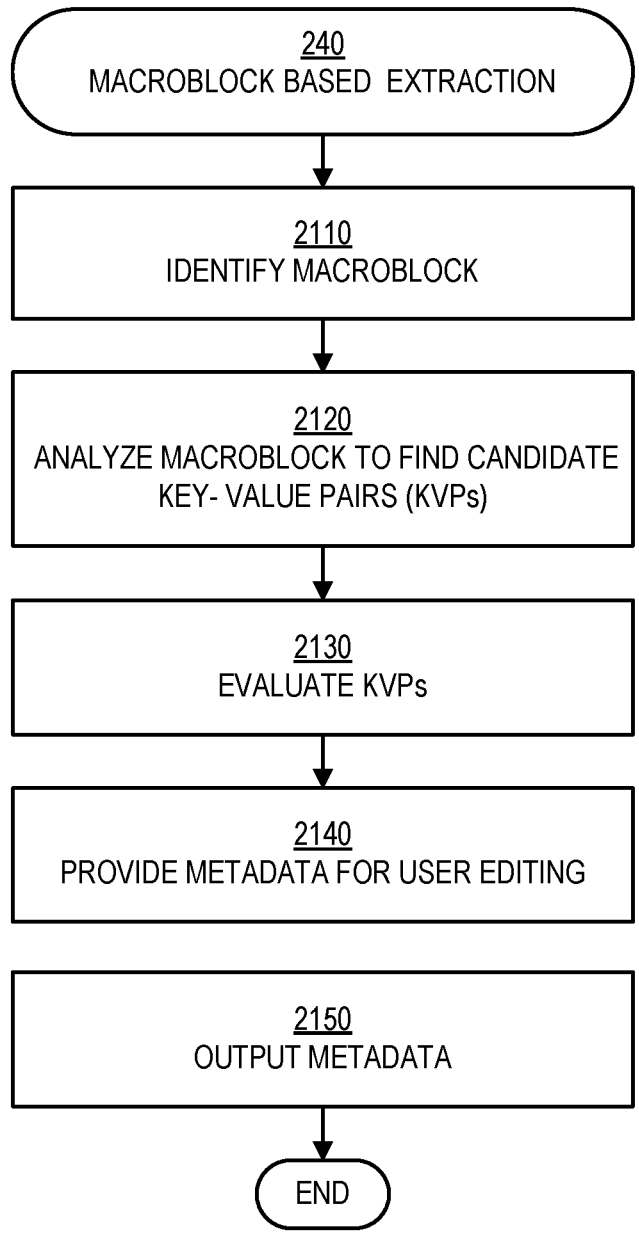
FIG. 5 depicts detailed operations of macroblock processing wherein macroblocks are identified and subject to processing for identification of microblocks therein.

FIG. 5 illustrates a method for macroblock extraction of metadata. The document digitization engine 120 outputs computational data provided by metadata to one or more process interface e.g. for use in updating semantic database 130 so that the taxonomical report improves processing by the document digitization engine 120 a next time the document digitization engine processes a document image similar to document image, for input into a search engine, application to a form, for use in a voice enabled application.

In block 2110 the document digitization engine 120 identifies a macroblock e.g. macroblock 1604D as shown in FIG. 6 including one or more microblock such as microblocks 1602A-1602K. The identification of a macroblock 1604D (FIG. 6) as set forth herein includes in one embodiment analyzing adjustable collinear parameters for each microblock. As noted in reference to block 320 (FIG. 3) adjustable collinear parameters may include font; paragraph alignment; punctuation mark; and ontological matching. The document digitization engine 120 in one embodiment identifies (in block 220, FIG. 2) macroblock 1604D (FIG. 6) using another method e.g. application of a classifier such as a table, text density, address, or paragraph classifier. The document digitization engine 120 may iterate block 2110 until all macroblocks of a document image are identified. In the case a specialized macroblock is recognized, e.g. a table, specialized macroblock processing may proceed. In all cases generical macroblock processing as described in blocks 2110 may proceed.

In block 2120 the document digitization engine 120 uses the identified macroblock e.g. macroblock 1604D to find key-value pairs (KVPs). The identified KVPs may supplement any previously identified KVPs e.g. identified during a process to identify macroblock 1604D. Using the identified macroblock 1604D to find KVPs includes in one embodiment the document digitization engine 120 iteratively applying different microblock delineation machine logic rules so that different sets of microblocks are identified relative to the same content within a macroblock. With microblocks within a macroblock identified, the document digitization engine 120 in one embodiment on finding a "key" within one microblock searches each remaining microblock within the macroblock for a value corresponding to the key.

In block 2130 the document digitization engine 120 evaluates identified KVPs which may include associated confidence levels. For performance of block 2130 in one embodiment the document digitization engine 120 assigns a confidence level to each identified KVP. The document digitization engine 120 heuristically determines the confidence level of a KVP based on various factors such as the level of proximity, ontological matching of respective key names and data types. For keys and values frequently appearing in formal and transactional documents, the confidence levels of KVPs may be higher than custom keys and values in informal and personal documents. In one embodiment, the document digitization engine 120 applies as a factor for assigning a confidence level to a KVP whether the KVP has been previously determined to belong to a common macroblock. Thus, the document digitization engine 120 may assign a higher confidence level to the same two microblocks being evaluated as a KVP depending on whether the evaluation is performed (e.g. at block 320 FIG. 3) prior to identification of the key-value pair as belonging to a common macroblock, or (e.g. at block 2130) after a macroblock is identified that commonly encompasses microblocks being compared. Processing in blocks 2120 and 2130 in one embodiment is described further in reference to FIGS. 6-8.

Based on assigned confidence levels in block 2130 one or more KVPs subject to evaluation may be discarded or treated as titles (effective keys without values). In one embodiment, the document digitization engine 120 applies low-soft matching that is heuristically set at between 0-70% and high precision matches at 100%. The absence or retreatment of delimiters forms a major part of this ranking once the values are extracted.

In block 2140 the document digitization engine 120 provides computational data in the form of metadata for user editing. In block 2150 document digitization engine 120 outputs metadata e.g. to a process interface 149. Aspects of processing at block 2140 and 2150 are described further in reference to FIGS. 6 through 8.

FIG. 6 depicts an illustrative document image 1600 having macroblock 1604D identified by the document digitization engine 120. For example, the document digitization engine 120 may initially recognize microblocks 1602A-1602K and apply collinearity based block identification processing (FIG. 3 in block 320) to determine that macroblock 1604D is a macroblock encompassing microblocks 1602A. In another embodiment, macroblock 1604D may be recognized as a macroblock without prior recognition of microblocks 1602A-1602K e.g. using an applied classifier such as a table classifier, a word density classifier (an area where text density is above a threshold may be identified as a macroblock), an address classifier, a paragraph classifier. Embodiments herein recognize that alignment of objects may indicate "belonging" and therefore macroblocks that are identified areas useful to search for the presence of key-value pairs for instance. The document digitization engine 120 may delineate each identified microblock and macroblock with a rectilinear border. FIG. 7 illustrates the document image 1600 segmented alternatively according to application of a second microblock machine logic delineation rule, and FIG. 9 illustrates computational data provided by metadata output by the document digitization engine 120 based on processing of document image 1600.

As set forth herein the document digitization engine 120 may for each microblock of a document identify a macroblock by analyzing adjustable collinear parameters for each microblock. As noted in reference to block 320 (FIG. 3) adjustable collinear parameters may include font; paragraph alignment; punctuation mark; and ontological matching. In reference FIG. 6 the document digitization engine 120 may identify macroblock 1604A as encompassing microblock 1602B and 1602C based on alignment and on ontology in spite of the font size differential. In reference FIG. 6 the document digitization engine 120 may identify macroblock 1604B as encompassing microblock 1602D and 1602E based on alignment. In reference FIG. 6 the document digitization engine 120 may identify macroblock 1604C as encompassing microblock 1602F and microblock 1602G based on alignment and on ontology in spite of the font size differential. The document digitization engine 120 may identify macroblock 1604D as encompassing microblocks 1602A, 1602B, 1602D, 1602F, 1602H, and 1602K based on left side alignment between microblocks 1602A, 1602B, 1602D, 1602F, 1602H, and 1602K and hence establish macroblock 1604D encompassing microblocks 1602A, 1602B, 1602D, 1602F, 1602H, and 1602K as well as the remaining microblocks of microblocks 1602A-1602K based on right side border of microblock 1602K and the rectilinear configuration of macroblock 1604D. Thus, on completion of identification of macroblock 1604D, macroblock 1604D is determined to include microblocks 1602A-1602K. For determining macroblock 1604D from microblocks 1602A-1602K a first microblock delineation machine logic rule may be applied. According to a first microblock machine logic rule for example, double spaces between text segments may be ignored for purposes of microblock delineation. Accordingly, as shown in FIG. 6 microblocks 1602H-1602J are identified respectively as single microblocks.

With macroblock 1604D defined as shown in FIG. 6 the document digitization engine 120 may identify key-value pairs within macroblock 1604D. Identification of key-value pairs with macroblock 1604D identified may supplement a prior identification of key-value pairs performed for the identification of macroblock 1604D in the case macroblock 1604D has been identified by analysis of analyzing adjustable collinear parameters for each microblock. Identification of key-value pairs with macroblock 1604D identified in one embodiment is an initial key-value pair identification.

For identification of key-value pairs with macroblock 1604D defined as shown in FIG. 6 the document digitization engine 120 identifies microblocks within macroblock 1604D. In one embodiment, the document digitization engine 120 may use the microblocks 1602A-1602K as shown in FIG. 6 to search for and identify key-value pairs using the first microblock delineation rules (wherein double spaces are ignored and do not result in a delineation between microblocks).

In one embodiment, referring to FIG. 7 the document digitization engine 120 may apply various microblock delineation machine logic rules for identification of microblocks and in one embodiment may iteratively change microblock machine logic delineation rules for the identification of microblocks within a macroblock 1604D for purposes of expanding a search for key-value pairs (KVPs).

For identification of microblocks as shown in FIG. 7 the document digitization engine 120 identifies microblocks 1603A-1603N on the basis of a second machine logic rule microblock delineation rule wherein double spaces between microblocks are observed (rather than ignored) for purposes of delineation of a microblock; that is a double space between two text segments results in identification of two microblocks rather than a single microblock. The second machine logic rule results in the identification of additional microblocks, and therefore additional bases for identification of key-value pairs. With macroblock 1604D identified as set forth in FIG. 7 the document digitization engine 120 may use the newly identified microblocks 1603A-1603N to identify key-value pairs. For each key located in a microblock of microblocks 1603A-1603N the document digitization engine 120 may search for and identify a corresponding value within another microblock of microblocks 1603A-1603N. In the described example, the document digitization engine 120 identifies key-value pairs based on the content of microblocks 1603A-1603N. With the identification of additional microblocks 1603H-1603M (six microblocks identified in text in which three microblocks are identified using the first machine logic microblock delineation rule) the document digitization engine 120 may perform additional searching but the additional searching is economized and of low latency based on the additional searching being confined to the document image area of macroblock 1604D.

In one embodiment, a first microblock delineation machine logic rule that identifies fewer microblocks 1602A-1602K is applied for establishment of macroblock 1604D and key-value pairs and a second machine logic microblock delineation machine logic rule that identifies additional newly defined microblocks 1603H-1603M) (FIG. 7) within the macroblock 1604D (once established) is applied for identification of key-value pairs. Thus, in one embodiment ontological relationships identified using relatively coarsely defined microblocks may yield identification of a region of interest (a macroblock) which region of interest may then be subject to further analysis (which further analysis may include identification of relatively finely defined microblocks therein for extraction of KVPs).

With key-value pairs identified using microblocks 1602A-1602K and microblocks 1603A-1603N the document digitization engine 120 in one embodiment continues to identify key-value pairs using macroblock 1604D e.g. by identifying newly defined microblocks within macroblock 1604D using further changed microblock delineation machine logic rules and identifying new key-value pairs within macroblock 1604D based on the newly defined microblocks. According to one further changed microblock delineation rule for example the document digitization engine 120 in one embodiment observes rather than ignores a single space as an element delineating between microblocks. According to one further changed microblock delineation rule for example the document digitization engine 120 in one embodiment observes rather than ignores a hyphen "-" as a punctuation element delineating between microblocks. According to one further changed microblock delineation rule for example the document digitization engine 120 in one embodiment observes different line presentment as an element delineating between microblocks.

Figure 8:
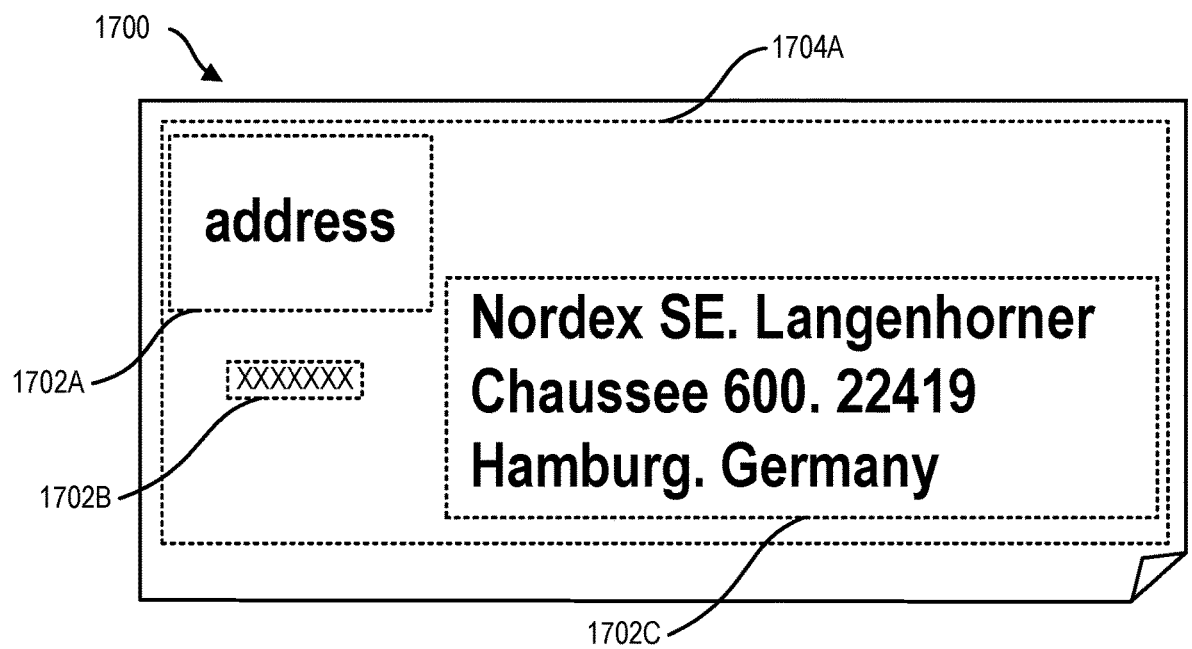
FIG. 8 depicts an exemplary document image, to which adjustable block identification parameters are applied in order to identify macroblocks, in accordance with one or more embodiments set forth herein.

Application of processes to identify key-value pairs both for or before the establishing of a macroblock and after establishing the macroblock provides advantages. Referring to FIG. 8 document image 1700 may include microblock 1702A microblock 1702B and microblock 1702C. During initial processing (e.g. according to block 320, FIG. 3)

analyzing adjusted collinear parameters between microblock 1702A and microblock 1702B may fail trigger output of a key-value pair e.g. based on a confidence level associated with an identified key-value pair being below a threshold. During initial processing analyzing adjusted collinear parameters as between microblock 1702B and microblock 1702C may fail trigger output of an identified key-value pair e.g. based on a confidence level associated with an identified key-value pair being below a threshold. However, during initial processing analyzing adjusted collinear parameters as between microblock 1702A and microblock 1702C may successfully trigger output of an identified key-value pair e.g. based on a confidence level associated with an identified key-value pair being above a threshold (e.g. based on the key "address" ontologically matching content of the address field as determined using key ontology data 137 of semantic database 130).

Based on content of microblock 1702A and microblock 1702C defining a key-value pair, macroblock 1704A (which by applied machine logic may be constrained to be rectilinear in shape) may be established so that microblock 1702B is encompassed within macroblock 1704A based on the ontological relationship between microblock 1702A and microblock 1702C. In the described example the document digitization engine 120 may be configured so that content of microblock 1702B is examined with content of microblock 1702A (or microblock 1702C) for identification of a key-value pair multiple times, for example (a) a first time before the establishment of macroblock 1704A and (b) a second time after the establishment of microblock 1704A which establishes microblock 1702B as being included within the macroblock 1704A encompassing microblock 1702A microblock 1702B and microblock 1702C. In one embodiment, the document digitization engine 120 may assign a higher (possibly threshold exceeding) confidence level to a candidate key-value pair resulting from the examining the second time based on the new information (resulting in additional applied weight) that the corresponding microblocks have been determined to be of a common macroblock. Thus, it is seen that identification of a KVP between content of first and second microblocks (e.g. microblocks 1702A and 1702C) that are unaligned may assist in the output of additional KVPs based on the establishing of a macroblock encompassing the first and second microblocks and potentially additional microblocks.

Exemplary metadata 140 for user editing based on processing of the macroblock 1604D of FIGS. 6 and 7 is shown in FIG. 9. The exemplary metadata 140 for user editing based on processing of the macroblock 1604D as shown in FIG. 9 may be presented in a user interface for display on display of user device 110. The metadata for user editing in FIG. 9 includes text based representations of confidence levels of each identified and user controls (Y/N) associated to the confidence levels permitting an administrator user to accept or reject a key-value pair for output.

The user using user device 110 may accept or reject each candidate KVP depicted using controls (Y/N). The document digitization engine 120 accordingly provides for self-guiding of an output metadata without requiring multiple training sets even where a received document subject to processing is a new document with no corresponding document class 131 in semantic database 130. Embodiments herein recognize that while the ability of the document digitization engine 121 to process a document image may be expected to improve with training as set forth herein useful metadata should not be predicated on training, but rather should provide useful metadata even where a document is a first document of a class. As seen by the metadata 140 of FIG. 9 a user may accept or reject found KVPs using a user interface using controls (Y/N). The user interface functionality associated to metadata depicted in FIG. 9 may include functionality whereby if the administrator user finds that the percentage extracted is low they click on a guide and go to a document representation and make additional corrections to the KVP determinations with confidence levels provided by the document digitization engine 120.

In block 2150 based on the provided metadata for user editing and based on selections of a user the document digitization engine 120 may output metadata 140 e.g. is shown in FIG. 9 (all identified KVPs accepted) potentially with some of the metadata presented to the user discarded based on the user selections. It will be understood that the document digitization engine 120 may be configured to proceed directly to output putting metadata e.g. to a process interface 149 based on all confidence levels being above a threshold which may be more likely with a reliable and trained document class 131 in semantic database 130.

For providing the metadata 140 shown in FIG. 9 the document digitization engine 121 reverse engineers a taxonomy based on identified macroblocks (e.g. encompassing two or more microblocks), identified microblocks and identified KVPs. The KVP organization into the metadata depicted in FIG. 9 is a reverse engineering of macro to micro block relationships. Considering that a single page of document image 181 may contain zero to M macroblocks, and each macroblock may contain zero to N microblocks, the candidate KVPs from each macroblock are assembled together in a hierarchy. Thus, in the example described the document digitization engine 120 may identify zero to M macroblocks for a document page and may assign a heading such as title for each microblock such as the title "Payment Details:" for the representative metadata 140 as shown in FIG. 9.

Referring to the output metadata 140 of FIG. 9, document digitization engine 120 may output metadata that is organized to specify a taxonomy indicating hierarchical relationships between objects of a document image 181. For example, in output metadata as indicated in FIG. 9, output metadata may presented in a form wherein individual KVPs that are extracted are associated to designators for the macroblocks in which they were discovered. Under the heading "Payment Details:" the taxonomy illustrated in FIG. 9 may include indicators of various KVPs. As shown in the example of FIG. 9 document digitization engine 120 may present the KVPs subheaded under a designator title (the title "Payment Details:") of their associated macroblock 1604D.

As shown in the example 9 the KVPs of metadata 140 may be presented in an order based on content of the document image 1600 (FIGS. 6 and 7). However, according to another embodiment, document digitization engine 120 may present KVPs according to an order that is not determined by an order of objects of a document image 1600. For example document digitization engine 120 may present KVPs, e.g. organized under an associated microblock designator, according to an order based on confidence level associated to the KVPs. In one embodiment, document digitization engine 120 may present KVPs, e.g. organized under an associated microblock designator, according to an order based on topic classification of the KVPs, e.g. according to a topic classification hierarchy. The document digitization engine 120 may employ Natural Language Processing (NLP) topic classification or NLP understanding processing (of external tools 170) for determining attributes of a taxonomy specified by output metadata. For example, in some use cases it may be useful to prioritize KVPs classified according to the topic "demographic" over KVPs that have not returned any classification when subject to topic based NLP processing, for example. The KVPs may alternatively be presented in an order that is based on the methodology for discovery of the KVP. In one embodiment, KVPs found using microblocks identified using a first microblock delineation machine logic rule (resulting in less microblocks being identified) may be presented before KVPs found using microblocks identified using a second microblock delineation machine logic rule (resulting in more microblocks being identified). In one embodiment, KVPs found via the processing in block 320 (FIG. 3) may be presented before KVPs found via the processing in block 2120 (FIG. 5). In one embodiment, KVPs found in a manner so as to infer a key associated to a value may be presented below KVPs where a KVP is expressly defined according to a document class 131 of semantic database 130. Output metadata that is organized to specify a taxonomy indicating hierarchical relationships between objects of a document image 181 provides numerous advantages e.g. ease of handling by downstream processes which become less reliant on rules based machine logic for processing of the metadata.

The document digitization engine 120 may employ Natural Language Processing (NLP) topic classification or NLP understanding processing (of external tools 170) for determining values of identified microblocks corresponding to identified candidate keys. For example, a key-pair identification may be provided if subjecting text of a microblock to NLP topic classification returns a topic or understanding matching the key or an alias of the key. A key-pair identification may also be provided if a topic returned by subjecting a first microblock to NLP topic classification matches a topic returned by subjecting a second microblock to NLP topic classification. Where subjecting text of a microblock to NLP topic classification results in a diversity of topics, the document digitization engine 120 may apply a generic "comment" key to the microblock.

Referring to the metadata of FIG. 9 output metadata may include metadata of latent KVPs without consistent structure or format. Embodiments herein provide for extraction of latent KVPs, e.g. KVPs without punctuation delimiters (like a colon ":"), KVPs having values with inferred keys correctly into a formal taxonomy. Embodiment herein provide for macroblock and microblock processing in connection ontology data of semantic database 130 to identify candidate keys and values.

Embodiments herein process documents including unstructured documents to present computational data to the consumer in a structured format, e.g. JSON or XML. Embodiments herein endeavor to extract text in a consumable fashion and to preserve styling information. Embodiments herein provide metadata that does not merely specify styling information (e.g. font size), but provides relative styling information, such as the height (size) of font in an area of a document image relative to a larger share of a document image. Relative styling information may be provided by relative styling parameter values as set forth herein. Text may be in bold or may have a variation in font height (size) or style. To a human reader, when done appropriately, these changes in style may convey a spectrum of emphasis; from a subtle comparison using italics to larger fonts that convey headers or some other form of information that is not contained in the syntactic or semantic content. Embodiments herein recognize that styling is a crucial yet challenging element to preserve. Embodiments herein set forth to provide relative styling information in metadata so as emulate human cognitive classification of patterns, wherein patterns tend to be classified in relative terms and not absolutes. With the relative styling information provided as machine readable computational metadata, the relative styling information facilitates a wide range of processes.

Embodiments herein recognize that while newer versions of PDF documents contain a backing XML structure which may preserve some styling information, styling information that is available is limited. For example, according to available technologies for processing a PDF document each object may be classified as having has its own font, font size, and color space. Embodiments herein recognize that organizations have vast numbers of PDF documents, many with no backing metadata.

Embodiment herein extract styling information from a document image for providing "relative styling information" from said document image.

In one embodiment, the document digitization engine 120 is configured to process a document image having text so that information in addition to the font type and size and font color is provided. Thus, for a segment of text in Helvetica 24 pt. the document digitization engine 120 may provide the output: 24 pt. Helvetica. Further, the document digitization engine 120 may extract and output relative styling information. Relative styling information may include the data e.g. that the text segment has a font (character) height (size) 10% higher than its neighbor or 50% higher, or 20% lower. The document digitization engine 120 may provide additional or alternative characterizing information regarding the font, e.g. may classify fonts into such classification as "business font" or "recreational font".

Configuring the document digitization engine 120 to output metadata that includes relative styling information improves text transformation, e.g. for the case that output metadata is output to a form regenerator or another process interface. The document digitization engine 120 may be configured for use in transforming text from an unstructured document into a format for display on an electronic device e.g. PC environment or mobile device. In one embodiment, the document digitization engine 120 may output metadata formatted in a stylesheet such as a Cascading Style Sheet (CSS) based on a processed document having relative styling information corresponding to relative styles of the processed document. In addition to or in place of performing a line-by-line conversion of source-to-target, where the styling information is specified in an identical manner, the document digitization engine 120 may output a CSS with relative styling information.

In one embodiment, for processing a document to output a CSS having relative styling information, the document digitization engine 120 may perform a larger area e.g. whole document analysis. By performing a larger area document analysis, the document digitization engine 120 may determine a baseline styling parameter value (or set of baseline styling parameter values) such as a baseline font height (size) parameter and or baseline white space size parameter for a document, and based on a determined one or more baseline styling parameter values the document digitization engine 120 may provision a stylesheet to inherit and alter these styles. If the original content had a section (e.g. word in a line of text) that was 10% higher than its neighbor, then this relative height information providing a relative styling parameter value may be represented in CSS. For example, the use of "font height: 80%;" in a styling block would create a style that refers to the parent element's font height (size), but was 20% lower.

The described processing provides a concept-by-concept conversion. Regardless of whether the intent is to perform a transformation from source-to-target, the extraction of relative styling information allows the non-semantic and non-syntactic emphasis present in styling information to be preserved for any downstream process.

For providing relative font height data defining a relative styling parameter value document digitization engine 120 may initially determine a baseline styling parameter value provided by a baseline font height for a document in an area of the document that is larger than a word, e.g. a full page of a document. For determining a font height baseline styling parameter, document digitization engine 120 may construct a histogram of word font heights throughout a document and a baseline styling parameter value may be determined based on a central dispersion of the histogram, e.g. a mean or median of font height values. On a text line by text line basis, document digitization engine 120 may assign a relative font height relative styling parameter value for each word e.g. as a percentage of the relevant baseline styling parameter value. In some embodiments baseline styling parameter values may be determined based on macroblock specific data (rather than full page data) or a combination of macroblock and global page data. In some embodiment K-means clustering analysis may be performed for determination of a font height baseline styling parameter value.

Relative styling information provided as part of output metadata 140 may include relative styling information on white spaces of a document (areas absent of text or other objects). For providing white space relative styling information for objects defining relative styling parameter values document digitization engine 120 may initially determine a white space baseline styling parameter value for a document in an area of the document that is larger than segment of line, e.g. a full page of a document. For determining a white space baseline styling parameter value, document digitization engine 120 may construct a histogram of white space sizes throughout a document and a baseline value for a baseline styling parameter value may be determined based on a central dispersion of the histogram, e.g. a mean or median of white space sizes. On a text line by text line basis, document digitization engine 120 may assign a white space relative styling parameter value for each white space of the line expressed as a percentage of the white space baseline styling parameter value. Thus, a double space white space might equate to a value of 101 (101% of baseline) for a normal document, but 150% for a document with highly dense text or 50% for a document with highly sparse text. In some embodiments baseline styling parameter values may be determined based on macroblock specific data or a combination of macroblock and global page data. In some embodiments K-means clustering analysis may be performed for determination of a white space baseline styling parameter value.

For providing the classifications of "business font" or "recreational font" the document digitization engine 120 may examine a lookup table that cross references fonts with respective "business font" or "recreational font" classifications. Fonts such as Baskerville or Times New Roman might be classified as "business fonts" whereas fonts such as Arial may be classified as recreational fonts.

Providing relative styling information may enhance the functioning of downstream processes having functions based on received metadata output by document digitization engine 120. For example, development of form regenerators may be automated or simplified based on output metadata having relative font height (size), white space or font type classifications to define relative styling parameter values. For example, in form regenerator machine logic, relative font height data indicating a sudden change to large font height may be examined and determined to represent a generic highlight rather than a specific highlight requiring reproduction of font height. For example, in the form regenerator output the sudden increase in font height may be expressed instead or also with a change in color e.g. from black to red indicative of a highlight. Where a form regenerator moves content to accommodate display on a specifically sized display, white space relative styling information (e.g. white space relative styling parameter values) in the context of white space baseline styling parameter values may be examined to verify that an adjustment will not yield an unacceptable change in the overall impact of provided by a change. The providing of font type classification ("business" and "recreational") avoids a need for example to access missing fonts from external resources. Relative styling information reduces complexity of machine logic for processing of output metadata.

FIG. 10 depicts an exemplary document metadata 140 corresponding to the document image 181, in accordance with one or more embodiments set forth herein.

The document digitization engine 120 processes the document image 181 and generates the document metadata 140. In certain embodiments of the present invention, the document digitization engine 120 generates the document metadata 140 in JavaScript Object Notation (JSON) format, as shown in the exemplary document metadata 140 of FIG. 10. The document image 181 is hierarchically organized as one or more block, which includes one or more line. Each line has one or more word. Each block, line, and word may be deemed as respective object within the document image 181, of which properties are respectively described in the document metadata 140.

Lines L401 indicates that the list describes a block represented by "BlockList". Lines L402 and L403 represent (x,y) coordinates of a starting point of the block. Line L403 indicates no remark is attached to the block. Line L403 indicates that the block is of a certain width. Line L406 indicates that the block has a line represented by "LineList".

Line L407 indicates that the line "LineList" has a word represented by "WordList". Line L408 indicates that the word has a value "XYZ Inc.", lines L409 and L410 respectively indicate height and density of the word. The height is specified to have a value of 204 to indicate that the height of the word is 204% of a baseline styling parameter value. Additional words of a line may be expressed with additional percentage values to the extent that have different heights. The value 204 or 204% may be given in the illustrative example of FIGS. 6 and 7 for the word "ANZ" "BANK" and "Winnellie" and the value 99 (99 percent) for the word "bank". Lines L411 and L412 represent (x,y) coordinates of a starting point of the word. Line L413 indicates a font height (size) of the word, as in a certain custom font size group, for further characterization of the font height (size) data. Line L414 indicates that the word would be identified by a "word_0" name. Line L415 indicates that the word has eight (8) characters, and line L426 indicates that the word is of a certain width. Measurement may be in pixel units, or according to any other custom units.

Lines L417 through 421 concludes the line "LineList" introduced in L406. A width of the line in L417, (x,y) coordinates of a starting point of the line in lines L418 and L419, a height of the line in Line L420, and a name "line_0" to identify of the line in line L421.

The context of an object is represented by how each object appears in a certain list together. Relative positioning and sizes of the objects may be determined based on various coordinates and dimensional elements such as height and width. The document metadata 140 is used as an input to the semantic normalization engine 160, particularly in order to assess a confidence score on a likelihood of a candidate key being an alias to a known key.

Lines L511 through L521 depict illustrative KVP metadata. Line L512 indicates that the candidate key is a member of a block identified by "block_16" name. "Block_16" may be specified in the document metadata for a context, position, and style. Line L513 indicates that a value of the candidate key is "573093486". Lines L514 and L515 indicate (x,y) coordinates of a starting point of the value of L513. Lines L516 and L517 indicate (x,y) coordinates of a starting point of the candidate key. Line L518 indicates that the candidate key has a text "Accnt No". Line L519 indicates that document digitization engine 120 determines that the key class "customerAccountNumber" is 82.35% likely to be a key class corresponding to the candidate key "Accnt No", based on the context, relative positioning, and styles represented in the document metadata, text sequencing, semantic matching, and vector space modeling and text classification. Output metadata 140 may specify a taxonomy indicating an organization and hierarchy among objects as set forth in connection with FIGS. 9 and 10.

The document digitization engine 120 may output metadata to a plurality of process interfaces. For example, output metadata may be used to (a) automatically adapt processes of document digitization engine 120, (b) accelerate information management, (c) accelerate a chat box, and/or (d) augment form generation.

Regarding (a) the document digitization engine 120 may adapt one or more process run by document digitization engine 120 based on output metadata, e.g. using relative styling information of output metadata as set forth herein. In one embodiment, document digitization engine 120 may automatically adjust a microblock delineation machine logic rule based on a white space baseline styling parameter value and/or a white space relative styling parameter value (e.g. as may be determined on a text line by text line basis according to one embodiment). For example, in the case of a relatively sparse page with large white spaces microblock delineation rules may be selectively enabled and activated that are less inclusive and identify fewer microblocks over a certain area (e.g. delineation triggered with a 5 space white space). In the case of a dense page with smaller white spaces microblock delineation rules may be selectively enabled and activated that are more inclusive and identify more microblocks over the certain area, e.g. wherein microblock delineation is triggered with a 2 space (double space) white space.

Further regarding (a) the document digitization engine 120 may update semantic database 130 using output metadata e.g. as shown in FIGS. 9 and 10. For example, in reference to the metadata of FIGS. 9 and 10 document digitization engine 120 may recognize e.g. via NLP processing that "Account Name" of document image 1600 is a prospective alias for the key "account number". By the output of metadata for updating semantic database 130, key ontology data 137 may be updated to include "account name" as a formal alias for "account number".

Regarding (b) the document digitization engine 120 may output metadata 140 to accelerate an information management service. Inputting metadata 140 as shown in FIGS. 9 and 10 into a search engine means that index fields will be identified with high precision. Rather than treating "BSB 015896 Account 2856-98739 Swift Code ANZBAU3M" as a single value (associated with some other index), the search engine may treat this as index=BSB, value=015896, datatype=Integer index=Account Number, value=285698739, datatype=Integer etc. In one embodiment, document digitization engine 120 may be provided as search engine interface for performance of search engine searched. Document digitization engine 120 configured as a search engine interface may receive search engine requests provided by unstructured document such as may be provided by PDF documents. Document digitization engine 120 may output metadata resulting from processing of such documents to a search engine for return of useful search results.

Regarding (c) the document digitization engine 120 may be provided as a chat interface and may be configured to access an unstructured document such as the document corresponding to document image 1600 for purposes of responding to questions presented in a chat environment. For responding to the question "What is the BSB for ANZ Bank Winnellie?" document digitization engine 120 may access and process the document corresponding to document image 1600, recognize fully-spanned semantic entities using high precision without noise. Based on processing by document digitization engine 120 the question becomes one of: "What is the <key> for <value>? Or What is the <value> for <key>? and by basic query algebra: What is the <key:BSB> for <value:ANZ Bank Winnellie> the answer is <015896>.

Regarding (d) the document digitization engine 120 may be used as a form regeneration tool. The document digitization engine 120 may output metadata to a form regenerator which regenerates the information of the document corresponding to the document image 181. The form regenerator receiving metadata 140 may regenerate this data into a form suitable for mobile or web or some other usability paradigm. For example, development of form regenerators may be automated or simplified based on output metadata having relative styling parameters such as relative styling parameters specifying font height (size), white space or font type classifications. For example, a configured form regenerator applying machine logic may perform examining relative font height relative styling information and based on the examining may determine that a sudden change from small height font to large height font represents a generic highlight rather than a specific highlight requiring reproduction of font height. For example, in an output provided by the form regenerator the sudden increase in font height may be expressed instead or also with a change in color e.g. from black to red indicative of a highlight. Where a form regenerator moves content to accommodate display on a specifically sized display, white space relative styling information in the context of white space baseline styling parameter values may be examined to verify that an adjustment will not yield an unacceptable change in the overall graphical impact of provided by a change. The providing of font type classification ("business" and "recreational") avoids a need for example to access missing fonts from external resources. Relative styling information reduces complexity of machine logic for processing of output metadata.

Certain embodiments herein may offer various technical computing advantages involving computing advantages to address problems arising in the realm of computer networks. Digital documents are often preferred for the convenience in computationally using data represented in the documents. When pen-on-paper documents are scanned in, the documents are a series of visual image of pages, but not computationally ready for usage as digital data. Accordingly, many document digitization applications have been developed in order to accurately extract computational data from document images. In existing document processing applications, numerous custom formats and organizations of documents present challenges in processing visual images of a document and extracting computational data out of the document. Embodiments herein implement a cognitive digitization process of document images as human readers understand meanings conveyed by visual marks in documents, and improves efficiency and accuracy of data extraction from document images. Embodiments herein provide for control of processes using metadata derived by processing of documents which may be provided by unstructured documents. Embodiments herein extract metadata from documents by methods that are not reliant solely on alignment of objects or on semantical relationships between objects but rather which employ a combination of alignment based processing and semantics based processing.

Figure 11:
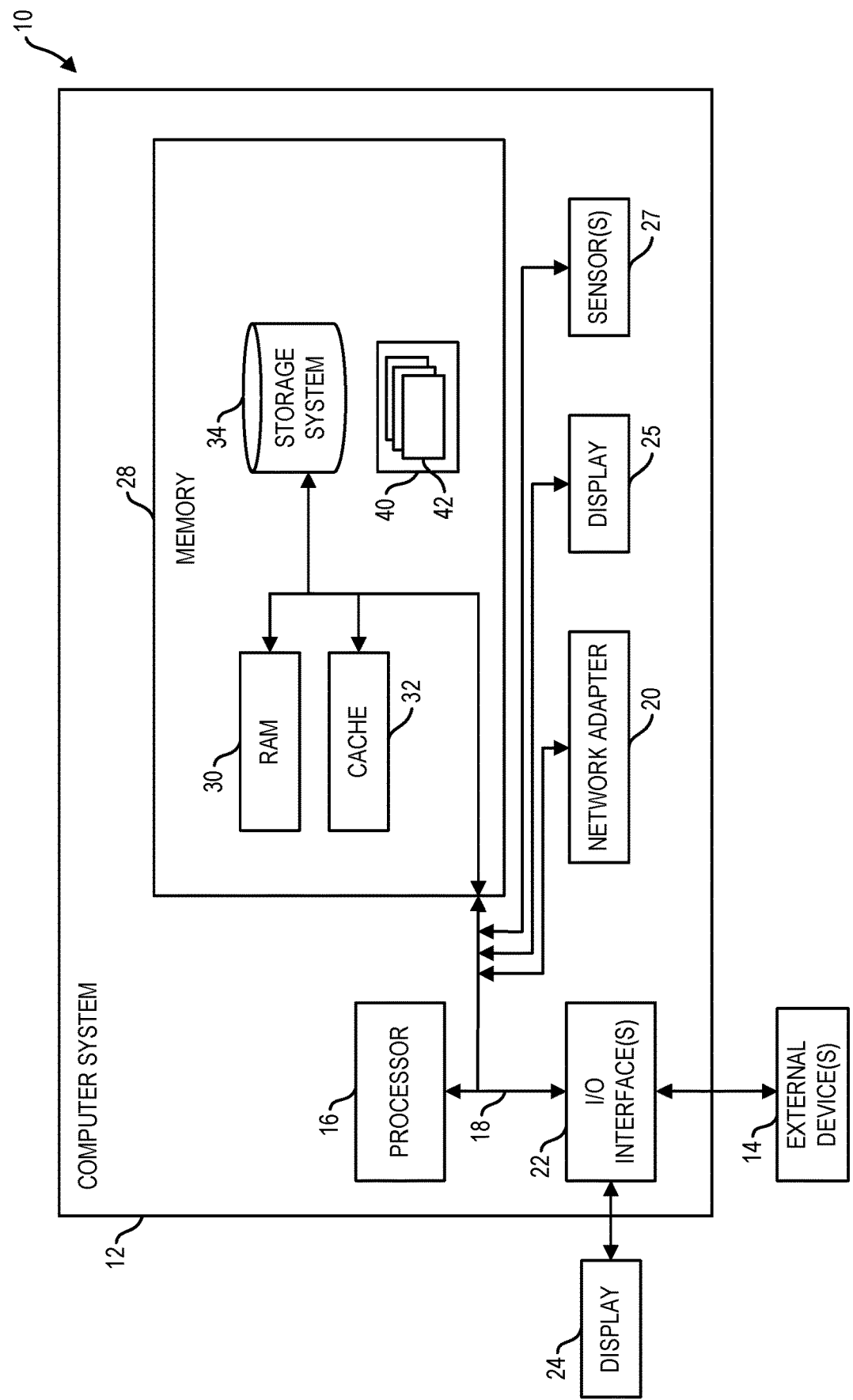
FIG. 11 depicts a cloud computing node according to an embodiment of the present invention.
Figure 12:
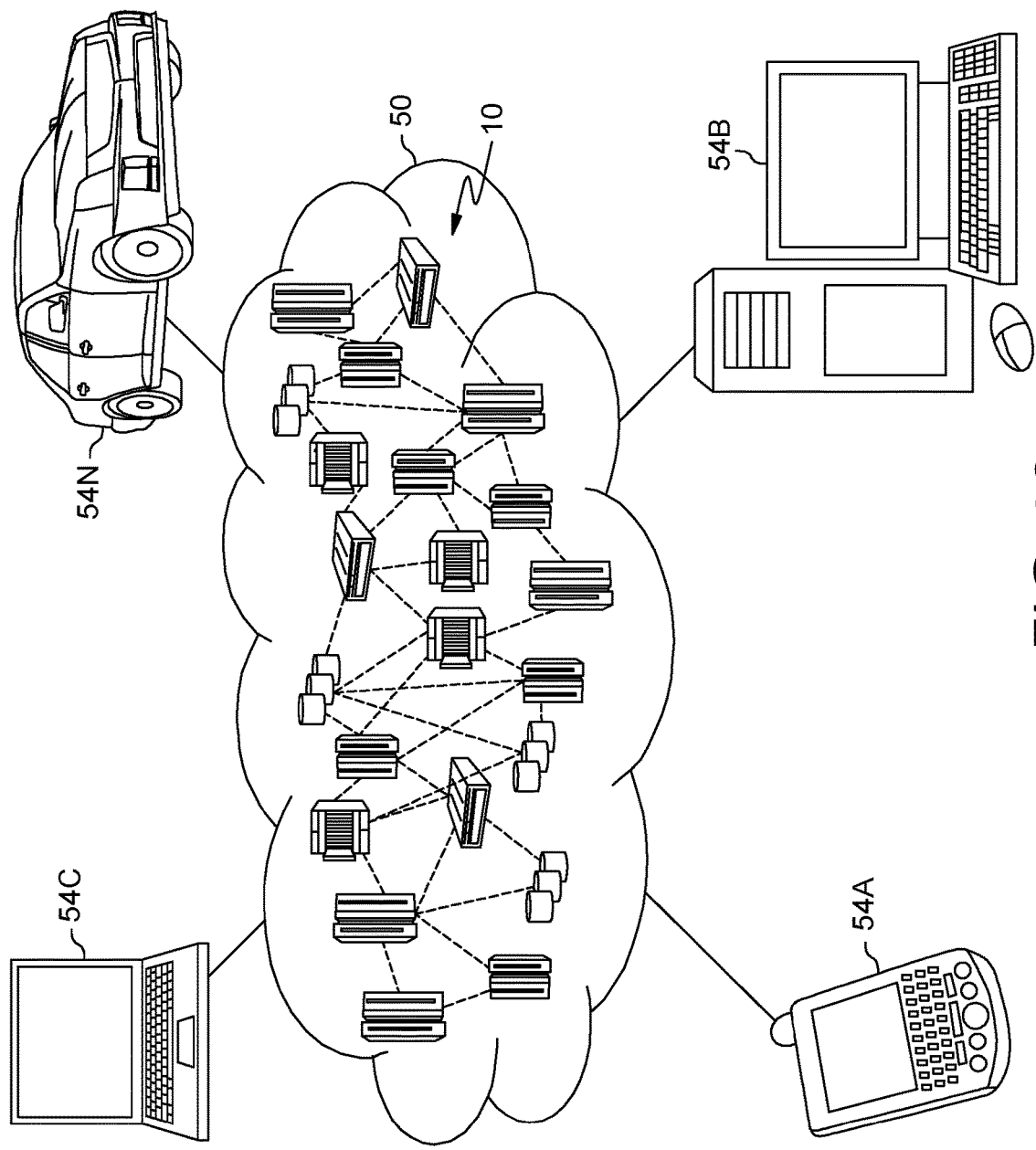
FIG. 12 depicts a cloud computing environment according to an embodiment of the present invention.
Figure 13:
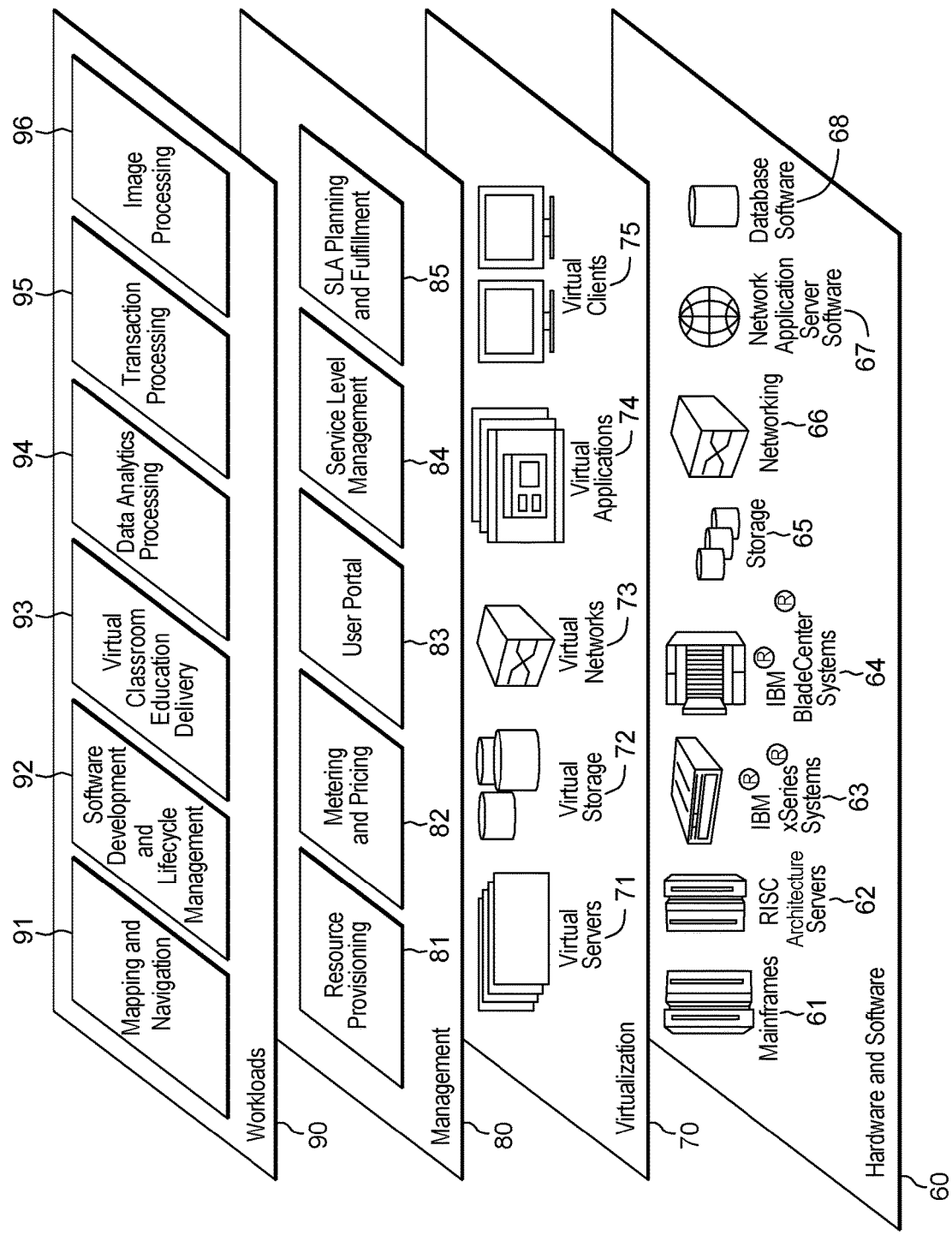
FIG. 13 depicts abstraction model layers according to an embodiment of the present invention.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 may be implemented as a cloud computing node in a cloud computing environment, or may be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, the document digitization engine 120 can include one or more computing node 10 and can include one or more program 40 for performing functions described with reference to various methods as are set forth herein such as the methods described in connection with the flowcharts of FIGS. 2, 3, and 5. In one embodiment, the respective components of FIG. 1 that are referenced with differentiated reference numerals may each be computing node based devices and each may include one or more computing node 10 and may include one or more program 40 for performing functions described herein with reference to the respective components.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which may be configured to provide user interface functionality, computing node 10 in one embodiment can include display 25 connected to bus 18. In one embodiment, display 25 may be configured as a touch screen display and may be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and may be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for processing document images as set forth herein. The processing components 96 may be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements may be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    obtaining a document image, wherein the document image includes a plurality of objects;
    identifying a macroblock within the document image, wherein the macroblock includes objects of the plurality of objects;
    examining content of microblocks within an area of the macroblock of the document image for extraction of one or more key-value pair, wherein the examining includes examining content of unaligned microblocks within the area of the microblock, and wherein the examining content of unaligned microblocks within the area of the microblock includes applying an ontological analysis; and
    outputting the one or more key-value pair.

2. The method of claim 1, wherein the examining content of unaligned microblocks within an area of a the macroblock includes iteratively performing the examining using different machine logic microblock delineation rules so that for a first iteration a first set of microblocks within the area of the macroblock is identified and for a second iteration a second set of microblocks within the area of the macroblock is identified, wherein a count of microblocks of the second set of microblocks is different from the count of microblocks of the second set of microblocks.

3. The method of claim 1, wherein the method includes processing the document image to identify a baseline styling parameter value, the baseline styling parameter value specifying a baseline font height, identifying for each word of a line of text of the document image a relative styling parameter, the relative styling parameter being defined in reference to the baseline styling parameter value, wherein the relative styling parameter specifies a font height of a word of text of the line of text as a percentage of the baseline styling parameter value, and wherein the method includes providing the relative styling parameter as output metadata for output.

4. The method of claim 1, wherein the examining includes analyzing respective semantic content of both a first microblock and a second microblock within the area of the macroblock, ascertaining that first semantic content of the first microblock is associated with a key name, discovering, from key ontology data corresponding to the key name, that a second semantic content of the second microblock is of a data type corresponding to the key name.

5. The method of claim 1, wherein the examining content of unaligned microblocks is commenced prior to the identifying a macroblock, and wherein the identifying a macroblock within the document image is performed based on the examining content of unaligned microblocks.

6. The method of claim 1, wherein the examining content of unaligned microblocks includes performing the examining in a first iteration and in a second iteration, wherein the first iteration results in the identifying the macroblock, and wherein the second iteration is performed subsequent to the identifying the macroblock.

7. The method of claim 1, wherein the examining content of unaligned microblocks includes performing the examining in a first iteration and in a second iteration, wherein the first iteration results in the identifying the macroblock, and wherein the second iteration is performed subsequent to the identifying the macroblock, wherein the performing the examining in in a first iteration includes applying a first machine logic microblock delineation rule to identify relatively fewer microblocks within the area of the macroblock, wherein performing the examining in a second iteration rule includes applying a second machine logic microblock delineation rule to identify relatively more microblocks within the area of the macroblock, wherein the outputting includes outputting the one or more key-value pair as metadata to a process interface selected from the group consisting of a process interface for document processing, a process interface for search engine searching, and a process interface for form regeneration.

8. A method comprising:
obtaining a document image, wherein the document image includes a plurality of objects;
processing the document image to identify a baseline styling parameter value, the baseline styling parameter value specifying a baseline font height;
identifying for a plurality of words of a line of text of the document image a relative styling parameter, the relative styling parameter being defined in reference to the baseline styling parameter value, wherein the relative styling parameter specifies a font height as a percentage of the baseline styling parameter value; and
providing the relative styling parameter as output metadata for output.

9. The method of claim 8, wherein the method includes determining the baseline styling parameter value by providing a histogram of font height values in an area of the document image that is larger than the line of text, and selecting the baseline styling parameter value based on a central dispersion of the histogram.

10. The method of claim 8, wherein the method includes outputting the output metadata to a process interface.

11. The method of claim 8, wherein the method includes outputting the output metadata to a process interface, wherein the process interface is a form regenerator that is configured to examine the relative styling parameter and based on the relative styling parameter indicating a change in height, changing an attribute of a word other than font height in an output document output by the form regenerator.

12. A method comprising:
obtaining a document image, wherein the document image includes a plurality of objects;
identifying a plurality of macroblocks within the document image;
performing microblock processing within macroblocks of the plurality of macroblocks, wherein the microblock processing includes examining content of microblocks within a macroblock for extraction of key-value pairs, the examining content including performing an ontological analysis of microblocks; and
outputting metadata based on the performing microblock processing within macroblocks of the plurality of macroblocks.

13. The method of claim 12, wherein the outputting metadata includes outputting metadata to a process interface.

14. The method of claim 12, wherein the examining content of microblocks within an area of a the macroblock includes iteratively performing the examining using different machine logic microblock delineation rules so that for a first iteration a first set of microblocks within the area of the macroblock is identified and for a second iteration a second set of microblocks within the area of the macroblock is identified, wherein a count of microblocks of the second set of microblocks is different from the count of microblocks of the second set of microblocks.

15. The method of claim 12, wherein the outputting includes discarding key-value pairs so that key-value pairs having confidence levels below a threshold are not subject to outputting.

16. The method of claim 12, wherein the examining content includes performing an ontological analysis of unaligned microblocks, and determining that unaligned microblocks are collinear based on the ontological analysis.

17. The method of claim 12, wherein the method includes determining a white space styling parameter value for an area of the document image larger than a microblock and applying a machine logic microblock delineation rule based on the white space styling parameter value.

18. The method of claim 12, wherein the method includes processing the document image to identify a baseline styling parameter value, the baseline styling parameter value specifying a baseline font height, identifying for each word of a line of text of the document image a relative styling parameter, the relative styling parameter being defined in reference to the baseline styling parameter value, wherein the relative styling parameter specifies a font height of a word of text of the line of text as a percentage of the baseline styling parameter value, and wherein the outputting metadata includes providing the relative styling parameter as output metadata for output.

19. The method of claim 12, wherein the metadata presents a hierarchy including indications of macroblocks, and identified key-value pairs identified and subheaded within designators for each macroblock.

20. A computer program product comprising:
  a computer readable storage medium readable by one or more processing circuit and storing instructions for execution by one or more processor for performing a method comprising:
  obtaining a document image, wherein the document image includes a plurality of objects;
  identifying a plurality of macroblocks within the document image;
  performing microblock processing within macroblocks of the plurality of macroblocks, wherein the microblock processing includes examining content of microblocks within a macroblock for extraction of key-value pairs, the examining content including performing an ontological analysis of microblocks; and
  outputting metadata based on the performing microblock processing within macroblocks of the plurality of macroblocks.

21. The computer program product of claim 20, wherein the method includes determining a white space baseline styling parameter value for an area of the document image larger than a microblock and applying a machine logic microblock delineation rule based on the white space baseline styling parameter value.

22. The computer program product of claim 20, wherein the examining content of microblocks within an area of a the macroblock includes iteratively performing the examining using different machine logic microblock delineation rules so that for a first iteration a first set of microblocks within the area of the macroblock is identified and for a second iteration a second set of microblocks within the area of the macroblock is identified, wherein a count of microblocks of the second set of microblocks is different from the count of microblocks of the second set of microblocks.

23. The computer program product of claim 20, wherein the outputting includes discarding key-value pairs so that key-value pairs having confidence levels below a threshold are not subject to outputting.

24. The computer program product of claim 20, wherein the examining content includes performing an ontological analysis of unaligned microblocks, and determining that unaligned microblocks are collinear based on the ontological analysis.

25. A system comprising:
  a memory;
  at least one processor in communication with the memory; and
  program instructions executable by one or more processor via the memory to perform a method comprising:
    obtaining a document image, wherein the document image includes a plurality of objects;
    identifying a plurality of macroblocks within the document image;
    performing microblock processing within macroblocks of the plurality of macroblocks, wherein the microblock processing includes examining content of microblocks within a macroblock for extraction of key-value pairs, the examining content including performing an ontological analysis of microblocks, wherein the microblock; and
    outputting metadata based on the performing microblock processing within macroblocks of the plurality of macroblocks.

* * * * *